United States Patent
Shinomoto et al.

(10) Patent No.: US 7,777,443 B2
(45) Date of Patent: Aug. 17, 2010

(54) METHOD FOR PROVIDING ENERGY SAVING SERVICE, METHOD FOR DECIDING SPECIFICATION OF ELECTRIC MOTOR, METHOD FOR PROVIDING COMPRESSOR VERSION-UP SERVICE, METHOD FOR PROVIDING ENERGY SERVICE USING DRIVE DEVICE FOR PERMANENT MAGNET ELECTRIC MOTOR, COMPRESSOR EXCHANGE METHOD, AND FREEZING/AIR CONDITIONING DEVICE

(75) Inventors: Yosuke Shinomoto, Tokyo (JP); Masaaki Yabe, Tokyo (JP); Mamoru Kawakubo, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 1096 days.

(21) Appl. No.: 10/534,255

(22) PCT Filed: Apr. 30, 2004

(86) PCT No.: PCT/JP2004/006323

§ 371 (c)(1), (2), (4) Date: May 10, 2005

(87) PCT Pub. No.: WO2004/100350

PCT Pub. Date: Nov. 18, 2004

(65) Prior Publication Data

US 2006/0122732 A1  Jun. 8, 2006

(30) Foreign Application Priority Data

May 8, 2003 (JP) ............................ 2003-130075

(51) Int. Cl.
*H02P 27/04* (2006.01)

(52) U.S. Cl. ............ 318/801; 318/727; 318/798; 318/800

(58) Field of Classification Search ............ 318/801, 318/727, 798, 800
See application file for complete search history.

(56) References Cited

U.S. PATENT DOCUMENTS 5,144,564 A  9/1992  Naidu et al.
(Continued)

FOREIGN PATENT DOCUMENTS

EP  0899864  3/1999
(Continued)

OTHER PUBLICATIONS

Hyunbae Kim et al., "Using On-line Parameter Estimation to Improve Efficiency of IPM Machine Drives", 2002, pp. 815-820, Dept. of Mech. Engr. And Dept. of Elect. & Comp. Engr., University of Wisconsin—Madison, 1513 University Avenue, Madison, WI 53706 USA.
(Continued)

*Primary Examiner*—Bentsu Ro
*Assistant Examiner*—Erick Glass
(74) *Attorney, Agent, or Firm*—Buchanan Ingersoll & Rooney PC

(57) ABSTRACT

An energy saving service includes: a service contract conclusion step in which a service contract is concluded with a customer who has purchased or will purchase a product with a permanent magnet motor; a driving device provision step in which a driving device which can drive a permanent magnet motor with any specifications is provided on the basis of the service contract; and a product upgrade step in which the driving device drives the permanent magnet motor so as to improve the performance of the product with the permanent magnet motor, thereby upgrading the product with the permanent magnet motor.

21 Claims, 10 Drawing Sheets

U.S. PATENT DOCUMENTS 5,739,650 A * 4/1998 Kimura et al. ......... 318/400.07

FOREIGN PATENT DOCUMENTS

| EP | 1085636 A2 | 3/2001 |
| EP | 1220439 A | 7/2002 |
| JP | 09-182499 | 7/1997 |
| JP | 09-191698 | 7/1997 |
| JP | 10-174456 | 6/1998 |
| JP | 10-174456 A | 6/1998 |
| JP | 10-229700 | 8/1998 |
| JP | 2000-245191 | 9/2000 |
| JP | 2000-312498 | 11/2000 |
| JP | 2000-341999 | 12/2000 |
| JP | 2001-069783 | 3/2001 |
| JP | 2001-155083 | 6/2001 |
| JP | 2002-327947 | 11/2002 |
| JP | 2003-075516 | 3/2003 |
| JP | 2003-75516 A | 3/2003 |
| WO | 02/091559 A1 | 11/2002 |
| WO | WO 02/091559 | 11/2002 |

OTHER PUBLICATIONS

B. Nahid Mobarakeh et al., "On-line Identification of PMSM Electrical Parameters Based on Decoupling Control", 2001, pp. 1-8, Group de Recherche en electronique de Nancy, CNRS UPRESA 7037 Institut National Polytechnique de Lorraine, 2, Ave. de la Foret de Haye, 54516 Vandoeuvre-les-Nancy, France.

Ha et al. "An Online Identification Method for Both Stator and Rotor Resistances of Induction Motors Without Rotational Transducers" IEEE Transactions on Industrial Electronics, 2000, vol. 47, No. 4, pp. 842-853.

Cheng et al. "On-Line Auto-Tuning of a DSP-Controlled BLDC Servo Drive" IEEE 32nd Annual Power Electronics Specialists Conference, 2001, vol. 3, pp. 1683-1688.

Lee et al. "Energy Management for Motors, Systems, and Electrical Equipment" IEEE Transactions on Industry Applications, 2002, vol. 38, No. 2, pp. 602-607.

Thomas A. Lipo. "Recent Progress in the Development of Solid-State AC Motor Drives" IEEE Transactions on Power Electronics, 1988, vol. 3, No. 2, pp. 105-117.

Supplementary European Search Report dated Jun. 18, 2009 in corresponding EPO Application No. 04730693.1, 3 pps.

Office Action for a corresponding Japanese Patent Application No. 2005-506016 issued on Oct. 27, 2009, 3 pages.

* cited by examiner

CONVENTIONAL SERVICE (a)

PRESENT SERVICE (b)

METHOD FOR PROVIDING ENERGY SAVING SERVICE, METHOD FOR DECIDING SPECIFICATION OF ELECTRIC MOTOR, METHOD FOR PROVIDING COMPRESSOR VERSION-UP SERVICE, METHOD FOR PROVIDING ENERGY SERVICE USING DRIVE DEVICE FOR PERMANENT MAGNET ELECTRIC MOTOR, COMPRESSOR EXCHANGE METHOD, AND FREEZING/AIR CONDITIONING DEVICE

TECHNICAL FIELD

The present invention relates to a method for providing a service which uses a motor and a driving device for driving the motor. The present invention relates to a service which can be newly created by identifying motor constants by the driving device itself.

BACKGROUND ART

According to conventional technology for identifying the motor constants of a permanent magnet motor by a driving device itself, an electric current passing through the motor and a voltage applied to the motor are controlled so as to identify the motor constants, in order to identify a counter-electromotive voltage constant of the motor. (Refer to, for example, patent document 1).

Also there is technology in which, as with above, an electric current passing through a motor and a voltage applied to the motor are controlled so as to identify motor constants, to identify a counter-electromotive voltage constant of the motor. (Refer to, for example, patent document 2).

Also there is technology in which an applied voltage is interrupted during the rotation of a motor, and a terminal voltage and a speed are detected at that time to calculate a counter-electromotive voltage constant. (Refer to, for example, patent document 3).

Also there is technology in which a predetermined input current is fed through an axis in an arbitrary direction, and the magnetic flux φ of a magnet in a permanent magnet motor is detected during its rotation on a coordinate axis in a direction orthogonal to the arbitrary direction, on which the current became zero. (Refer to, for example, patent document 4).

Also there is a technology in which a calculation coefficient of a magnetic flux calculator of a permanent magnet motor is adjusted in accordance with an electric current of a dq-axis component, in order to identify flux interlinkage. (Refer to, for example, patent document 5).

Also there is a technology in which the flux interlinkage of a permanent magnet motor is estimated from a torque command current value and a fed-back torque current detection value, and the torque command current value is output on the basis of the estimated flux interlinkage. (Refer to, for example, patent document 6).

Also there is a technology in which the inductances of a permanent magnet motor in a d-axis and a q-axis are measured by the static coordinate transformation of a current which is obtained by the application of three types of pulses. (Refer to, for example, patent document 7).

Also there is a technology relating to an energy saving service which offers an energy-saving effect with reduced initial investment due to the installation of an inverter. (Refer to, for example, patent documents 8 and 9).

[Patent document 1] Japanese Patent Laid-Open Publication No. 2000-341999
[Patent document 2] Japanese Patent Laid-Open Publication No. Hei 9-191698
[Patent document 3] Japanese Patent Laid-Open Publication No. 2000-245191
[Patent document 4] Japanese Patent Laid-Open Publication No. 2000-312498
[Patent document 5] Japanese Patent Laid-Open Publication No. Hei 9-182499
[Patent document 6] Japanese Patent Laid-Open Publication No. Hei 10-229700
[Patent document 7] Japanese Patent Laid-Open Publication No. 2001-69783
[Patent document 8] Japanese Patent Laid-Open Publication No. 2001-155083
[Patent document 9] Japanese Patent Laid-Open Publication No. 2002-327947

The technology disclosed in the patent document 1 adopts a position sensor-less method, by which the position of a rotor of a synchronous motor is not detected. Thus, a control block also estimates the speed and position at the same time.

To estimate the speed and the position, motor constants are necessary. However, the motor constants are identified after an induced voltage has been estimated from an estimated value and a detection value of a current in a γδ axis for the identification. When the control block is structured in such a manner, an error in the identification of the motor constants causes an error in the estimation of the speed and position. Furthermore, the error in the estimation of the rotor position causes an error in a section for converting three-phase current into the current in the γδ axis. Therefore, since control was made viable by estimating estimation, it was necessary to make an error added up with respect to all of estimation as small as possible, and hence high-performance control was difficult.

Furthermore, the current in the γδ axis was controlled to identify the constants, so that the voltage was applied for identification. The motor was used with low efficiency because any optimal voltage, by which the motor was at a maximum efficiency operating point, was not applied. The technology disclosed in the patent document 1 pursued control performance such as response speed and stability rather than the efficiency of the motor. Therefore, the technology disclosed in the patent document 1 could not satisfy optimization in the efficiency of the motor, energy saving, and the like.

The patent document 2 discloses the similar technology. A control block for identifying and estimating motor constants, however, is contained in a control block for estimating a position. This is also the technology for pursuing control performance, and cannot satisfy optimization in the efficiency of the motor, energy saving, and the like.

Furthermore, in the technology disclosed in the patent document 3, the applied voltage is interrupted during the rotation of the motor. By detecting the terminal voltage and speed at that time, a counter-electromotive voltage constant is calculated. In the technology disclosed in the patent document 3, since the applied voltage is interrupted even temporarily, the speed of the motor slows down. Thus, there are cases where the applied voltage cannot be interrupted according to a load connected to the motor. When the inertial force of the load is small, high detection speed response is also necessary to quickly detect the terminal voltage and speed of the motor after the interruption of the applied voltage. The detection of the speed in such a state requires extremely high accuracy and high cost.

If the interruption of the applied voltage is instantaneously cleared, there are cases where the speed of the motor slows down to a stop state or nearly the stop state, and a restart becomes necessary. In the case of sensor-less drive, it cannot be assured that the restart is certainly carried out one hundred percent. Thus, there is a possibility that the motor stops even temporarily to identify the counter-electromotive voltage constant.

Furthermore, the patent document 4 also discloses the technology about a method for identifying motor constants of the permanent magnet synchronous motor. A method for detecting the magnetic flux φ of the permanent magnet during its rotation is disclosed. The motor, however, has the structure of sensor drive using a position sensor, instead of position sensor-less drive, so that it is extremely difficult to apply the technology disclosed in the patent document 4 to the sensor-less drive from the viewpoint of cost and technology.

The patent documents 5 and 6 disclose the technology for identifying motor constants. The technology can detect the motor constants with high precision with the use of a position sensor, as with above, but cannot be applied to position sensor-less drive.

Furthermore, the patent document 7 discloses the technology for measuring the inductances by applying the pulses. However, it is known that the motor is an LR load, and it is also known that a resistance component (R) of an LR circuit is ignorable by applying the pulses for minute time. According to the technology disclosed in the patent document 7, an electric current, which is obtained by applying the three types of pulses, that is, u+, v−, and w−, and u−, v+, and w−, and u−, v−, and w+ of a switching element, is subjected to the static coordinate transformation, to measure the inductances.

Assuming that the pulses are applied for the minute time in such a manner, however, it is described that the minute time is sufficiently shorter than a time constant L/R of the permanent magnet motor. There is a contradiction that pulse time for measuring the unknown motor constants is sufficiently shorter than the time constant L/R of the motor constants.

Furthermore, when the pulse time is too short, sufficient electric current does not flow, and residual magnetic flux due to the application of the pulses causes an offset in the electric current. Thus, there is a problem that the inductances cannot be measured with precision. To solve this problem, it is necessary to elongate the minute time of applying the pulses. The minute time, however, has to be sufficiently shorter than the time constant L/R of the motor constant. Thus, this method is effective when a value of an inductance component has been already known to a certain degree, but is difficult to use when the value of the inductance component has been unknown.

The patent document 7 also discloses the technology for calculating a counter-electromotive voltage constant. According to the technology in this publication, an electromotive coefficient is adjusted so as to adjust an error in speed due to electromotive force which has been estimated during existing sensor-less drive. Thus, the technology is available only in sensor-less control for estimating the electromotive force.

Furthermore, the patent documents 8 and 9 disclose the services which provide a user with the merit of an electric power saving effect by capacity control by the inverter, if the user without the inverter desires energy saving. According to the present invention, it is noted that capacity control by an inverter consumes less electric power than the constant speed of a motor. An investment for the installation of the inverter is obtained by a reduced electric bill due to electric power saving as a service charge.

In the services disclosed in the patent documents 8 and 9, a user who has already installed the inverter cannot get the electric power saving effect. Thus, a service, which is described in the present invention, is not applicable thereto.

As described above, the methods for identifying the motor constants of the permanent magnet motor has begun to be proposed, but technology for using the results of identification has not yet put to practical use. Furthermore, a service for providing energy saving for the user, who has already installed an inverter, is difficult because of the foregoing reasons.

To solve the foregoing problems, an object of the present invention is to provide a service using a motor device with high reliability, which can always operate with high efficiency irrespective of position sensor drive control and position sensor-less drive control, and a service using a driving method of the motor. Another object is to provide a service which enables an exchange of a motor or a compressor with the motor even if motor constants of the motor are unknown, irrespective of position sensor drive control and position sensor-less drive control.

Further, another object is to obtain a service using a motor device and a driving method of a motor. In the motor device and the driving method of the motor, even if motor constants of the motor are unknown, the motor is operated in an efficient operating state while detecting the motor constants which vary every moment by operating the motor. Further another object of the invention is to obtain a service using a motor device and a driving method of a motor. In the motor device and the driving method of the motor, even if an inverter has been already installed, an exchange of a motor or a compressor for the motor with unknown motor constants is possible irrespective of position sensor drive control and position sensor-less drive control. The motor is operated in an efficient operating state.

Further, another object is to provide a service using a motor device, wherein position sensor-less drive is realized, and the motor device is efficiently operated by the position sensor-less drive. Further another object of the invention is to provide a service and a freezing/air conditioning device using a refrigeration cycle device with high efficiency and reliability.

Further another object of the present invention is to provide a service using a driving device of a motor. In the service, the motor has an estimator which can estimate the actual rotating coordinate axis of the motor, so as to realize the detection of a counter-electromotive voltage constant in any position sensor-less drive, and also realize the position sensor-less drive using the axis estimator. Further another object is to obtain a service using a driving device of a motor, which measures inductance with high precision irrespective of time of pulse application.

Further, another object of the present invention is to provide various types of service using a driving device of a motor. In the service, the driving device itself being an inverter converges an amount of applied voltage, an accelerated frequency, and a frequency for judging actuation to appropriate values in accordance with an axial load of a motor at starting, even if the motor has different specifications, in order to realize a positive startup of the motor and judge a starting state.

Further, another object of the present invention is to carrying out an exchange service to exchange a motor or a compressor for an efficient one, and an energy saving providing service. In the exchange service and the energy saving providing service, a driving device of the motor having the function of identifying motor constants is used. The function is structured so as to identify the motor constants which are necessary for driving the motor.

Further, another object is to provide an energy saving service which makes it possible for a customer to reduce initial investment cost for the change of facilities, and to achieve energy saving. Further another object is to provide a service using a driving device of a motor or the motor in which if the motor with any specifications is installed in a product, it is possible to develop the product in a short period and at low cost.

DISCLOSURE OF THE INVENTION

A method for providing an energy saving service according to the present invention comprises: a service contract conclusion step in which a service contract is concluded with a customer who has purchased or will purchase a product with a motor; a driving device provision step in which a driving device that can drive a motor with any specifications is provided on the basis of the service contract; and a product upgrade step in which the driving device drives the motor, and the drive of the product with the motor is controlled so as to improve the performance of the product with the motor, to upgrade the product with the motor.

According to the present invention, providing a service using an automatic tuning inverter makes it possible to provide energy saving technology for a user at low cost, and to easily introduce a motor to a product manufactured by the user. Also, it becomes possible to always operate the motor with high efficiency.

BEST MODE FOR CARRYING OUT THE INVENTION

First Embodiment

Before describing an embodiment of the present invention, a compressor and an inverter as a driving device for driving the compressor will be described. A compressor using a permanent magnet motor is widely used and installed in a freezing/air conditioning device such as an air conditioner. Since the permanent magnet motor is a synchronous motor, it is necessary that an inverter controls an energizing phase in accordance with the position of a rotor which composes the motor. Since the synchronous motor being the permanent magnet motor is used, a loss due to a slip is prevented. Thus, the compressor has high energy saving performance.

However, the motor is disposed inside a case which is tightly sealed at high temperature and high pressure in the compressor. Thus, in the case of a compressor, it is difficult to dispose a position sensor for detecting the position of the rotor of the motor. Accordingly, position sensor-less drive has become the mainstream of drive of the compressor.

Figure 1:
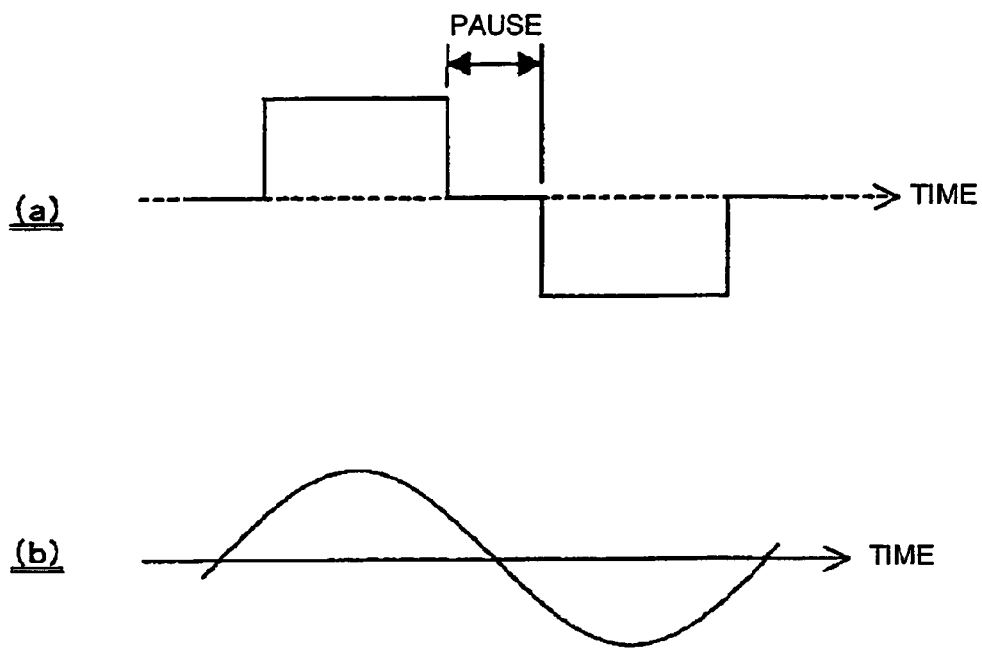
FIG. 1 is an explanatory diagram which explains a method for driving a permanent magnet motor according to a first embodiment of the present invention.

There are two position sensor-less methods of the permanent magnet motor. One is a driving method of a waveform shown in FIG. 1(a), which is called rectangular wave drive. The other is a driving method of a waveform shown in FIG. 1(b), which is called sine wave drive. FIG. 1 is a drawing for explaining the driving methods of the permanent magnet motor. FIG. 1(a) shows the case of the rectangular wave drive, and FIG. 1(b) shows the case of the sine wave drive. In the case of the rectangular wave drive, as shown in FIG. 1(a), there is a pause, in which energization pauses. A counter-electromotive voltage is detected from a terminal of the motor during this pause, and the position of the rotor is detected to realize position sensor-less.

The position sensor-less drive by this rectangular wave drive is generally used. When the rectangular wave drive is used, the counter-electromotive voltage of the motor is directly detectable during the pause of energization. Thus, it is possible to drive a permanent magnet motor even if the permanent magnet motor has different specifications.

The position sensor-less drive by the sine wave drive uses motor constants which indicate the specifications of the permanent magnet motor connected to the inverter. The position of the rotor or the energizing phase is calculated from the motor constants, to realize position sensor-less.

The position sensor-less drive by the sine wave drive is superior to the rectangular wave drive in point of low noise, and is able to increase the inclination of the applied voltage with respect to the number of revolutions, which is called V/f of the motor, in comparison with the sine wave drive. Increase in the V/f of the motor means reduction of an electric current passing through the motor. Thus, the larger the V/f of the motor, the more superior the motor is in point of efficiency in general.

Accordingly, an inverter for a compressor by the sine wave drive has begun to become commercial in recent years. Since the sine wave drive uses motor constants, it is necessary to integrally deal with the inverter and the motor in a state that the motor constants have already been known. When a motor having motor constants which are different from data stored in the inverter is connected to the invention, the motor cannot be driven.

In the case of a driving device using the rectangular wave drive, a compressor can be driven even if the compressor is exchanged. The sine wave drive, however, needs the motor constants, so that a compressor cannot be driven even if the compressor is simply exchanged. The inverter as the driving device has to be exchanged too. Accordingly, if an automatic tuning function is added to the inverter so that the inverter itself can identify the motor constants of a permanent magnet motor with any specifications, and the motor can be driven by use of the identified motor constants, a substituted compressor equipped with a motor having any specifications (for example, a compressor of the sine wave drive), can be driven after replacing an old compressor.

Then, the automatic tuning function will be described. The automatic tuning function is the function of identifying motor constants of a motor to be driven. The automatic tuning function also includes the identification of constants of control coefficients, such as the inertia of a load connected to the motor and gain of a controller, in addition to the motor constants.

As the motor constants of a permanent magnet motor, four motor constants of phase resistance, d-axis inductance, q-axis inductance, and a counter-electromotive voltage constant are generally known. In the case of the permanent magnet motor, there is the motor constant of the counter-electromotive voltage constant which is difficult to identify when the motor is not in operation. In this embodiment, the automatic tuning technology of the permanent magnet motor deals with these motor constants (phase resistance, d-axis inductance, q-axis inductance, counter-electromotive voltage constant, and the like), and tuning for identifying parameters for startup is also treated as automatic tuning.

There is, for example, a method for startup in which a forced rotating magnetic field is applied. The amount of applied voltage which can actuates the motor by a method called forced V/f is automatically set to the inverter, and furthermore the speed can be automatically accelerated to the limit number of revolutions of forced revolutions.

Such a method for startup can actuate the motor and secure a rotating state, even if the specifications of the motor are unknown. The specifications of the motor include the counter-electromotive voltage constant, which is difficult to identify before rotation by motor constants identification technology (also called the automatic tuning function) being the technology of identifying the motor constants, which should be described as the specifications of the motor. Thus, this startup method makes it possible to identify the counter-electromotive voltage constant, and is suitable for the automatic tuning.

A method for identifying the motor constants according to this embodiment will be described. A method for identifying the phase resistance will be first described. To identify a resistance component, it is easiest that a direct-current voltage is applied from an inverter so as to lock a motor, and the resistance component is identified from a flowing locking current. This is because the motor is considered as merely an LR load, when the motor is locked. When the direct-current voltage (for example, represented as E) has been applied to the LR load and a predetermined time has elapsed, the electric current converges and stabilizes at a constant value (E/R).

Then, a method for identifying an inductance component will be described. When the motor is a permanent magnet motor and rotates, an induced voltage by a permanent magnet provided in the rotor is induced on the side of a stator of the motor. Thus, it is preferable that the inductance component be identified without rotating the motor, as in the case of the foregoing method for identifying the resistance while locking the rotation of the motor.

Then, a pulse voltage with a high frequency is applied to the motor. A pulse current flows through the motor by the application of the pulse voltage, but the motor is considered to be the LR load, as described above, if the motor does not rotate by applying the pulse voltage. When an applied pulse time is a minute time, which is much smaller than the time constant of LR, the effect of a resistance component R does not appear in the flowing pulse current. This is because a current i in a LR direct-current circuit, which is a function of time t, becomes E/L, when t is a minutes time and is in the limit of t=0. This means that it is possible to exclude the effect of the resistance component R. Thus, the resistance component R is removable by applying a pulse, and the effect of induced voltage is also negligible because the motor does not rotate. Therefore, it is possible to identify the inductance component from the applied pulse voltage and the detected pulse current.

A method for identifying the counter-electromotive voltage constant will be described at last. When the motor stably rotates by forced revolutions, a differential term being a transient term of a voltage-current equation of the motor during stable revolutions becomes zero. Thus, the counter-electromotive voltage constant is calculated by an inverse operation by use of the voltage-current equation of the motor. In this case, however, since the phase resistance R and inductance components Ld and Lq of the motor are used in the voltage-current equation, the counter-electromotive voltage constant can be identified after the foregoing resistance and inductance components are identified. There is no problem if which of the resistance and inductance is first identified.

Furthermore, the automatic tuning function, which is here described, identifies the constants so as to not only operate a motor with any specifications, but also not to impair the energy saving performance of a permanent magnet motor. Thus, there is the function of realizing the optimal drive of the permanent magnet motor.

As a method for optimally driving a motor, for example, the phase current minimizing control of the motor may be carried out. The torque of the motor is represented by a mathematical expression using the motor constants. By differentiating a current component of this mathematical expression which expresses the outputted torque, a minimum value of the phase current can be calculated. In the case of a current minimizing control method, the efficiency of the motor does not become maximum due to an iron loss included in the motor, but the motor can operate in a state extremely near maximum efficiency. The motor constants are also used in the foregoing operating method, so that the identification technology of the motor constants is extremely important to operate the permanent magnet motor.

By the way, it is extremely rare for a sold refrigerating or air conditioning device such as an air conditioner to exchange its compressor. An inverter with the automatic tuning function has excessive specifications, and increase in cost due to the automatic tuning function is not returned to a user who purchases the air conditioner. The freezing/air conditioning device has a refrigeration cycle in which a refrigerant discharged from the compressor circulates through a condenser, an expansion valve, and an evaporator via pipes, and returns to the compressor.

The user, on the other hand, does not purchase a new freezing/air conditioning device such as an air conditioner if the user has once purchased it, except when its performance is extremely decreased because of degradation with a lapse of time, or the refrigeration or air conditioning device is broken. Thus, although freezing/air conditioning devices such as air conditioners with high energy saving performance have been manufactured and sold year after year, the user, who had once purchased a freezing/air conditioning device, could not easily purchase a new one because cost for purchasing a new unit was necessary for replacement by the user, even if the user desired energy saving.

This embodiment uses the automatic tuning function in a service for offering energy saving technology, which has advanced year after year, to a user at low cost. By doing so, energy loss from individual households and stores, which increases because of decrease in the performance of a product while nobody knows, is prevented. This embodiment aims at an effective environmental measure.

Conventionally, a user, being the side of using a service, generally kept using a purchased freezing/air conditioning device such as an air conditioner, after the user had once purchased it manufactured by a maker. The freezing/air conditioning device such as the air conditioner, however, is a product which consumes as large electric power as occupying approximately a quarter of the whole electric power consumption of a general household. Thus, refrigerating or air conditioning devices with high energy saving performance have been manufactured year after year.

A compressor is the heart of the freezing/air conditioning device such as the air conditioner. It is not a stretch to say that the performance of the compressor decides the performance of the freezing/air conditioning device such as the air conditioner. To increase the efficiency of the freezing/air conditioning device such as the air conditioner, the compressor has been especially improved year after year. As developing, the shape of an applied permanent magnet motor is changed, and a used material is improved to realize high efficiency and low noise.

This embodiment aims to upgrade an air conditioner to a one with high energy saving performance at lower cost than re-purchase of a new one, by replacing a compressor with a new one in which a motor with higher efficiency obtained by use of the automatic tuning function is installed.

Figure 2:
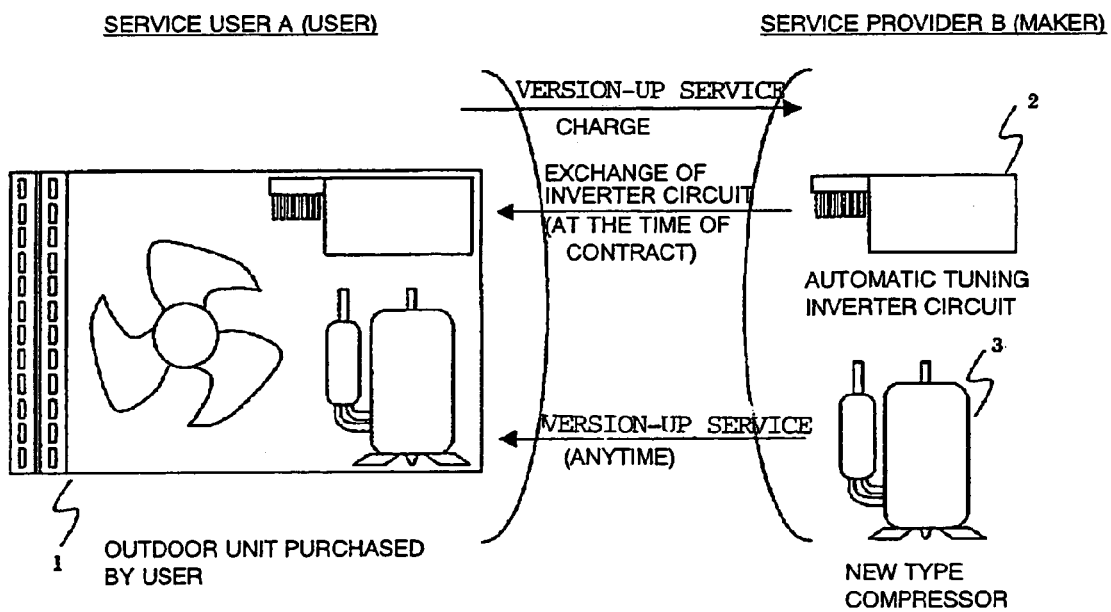
FIG. 2 is an explanatory schematic diagram which explains the flow of a service according to the first embodiment of the present invention.
Figure 3:
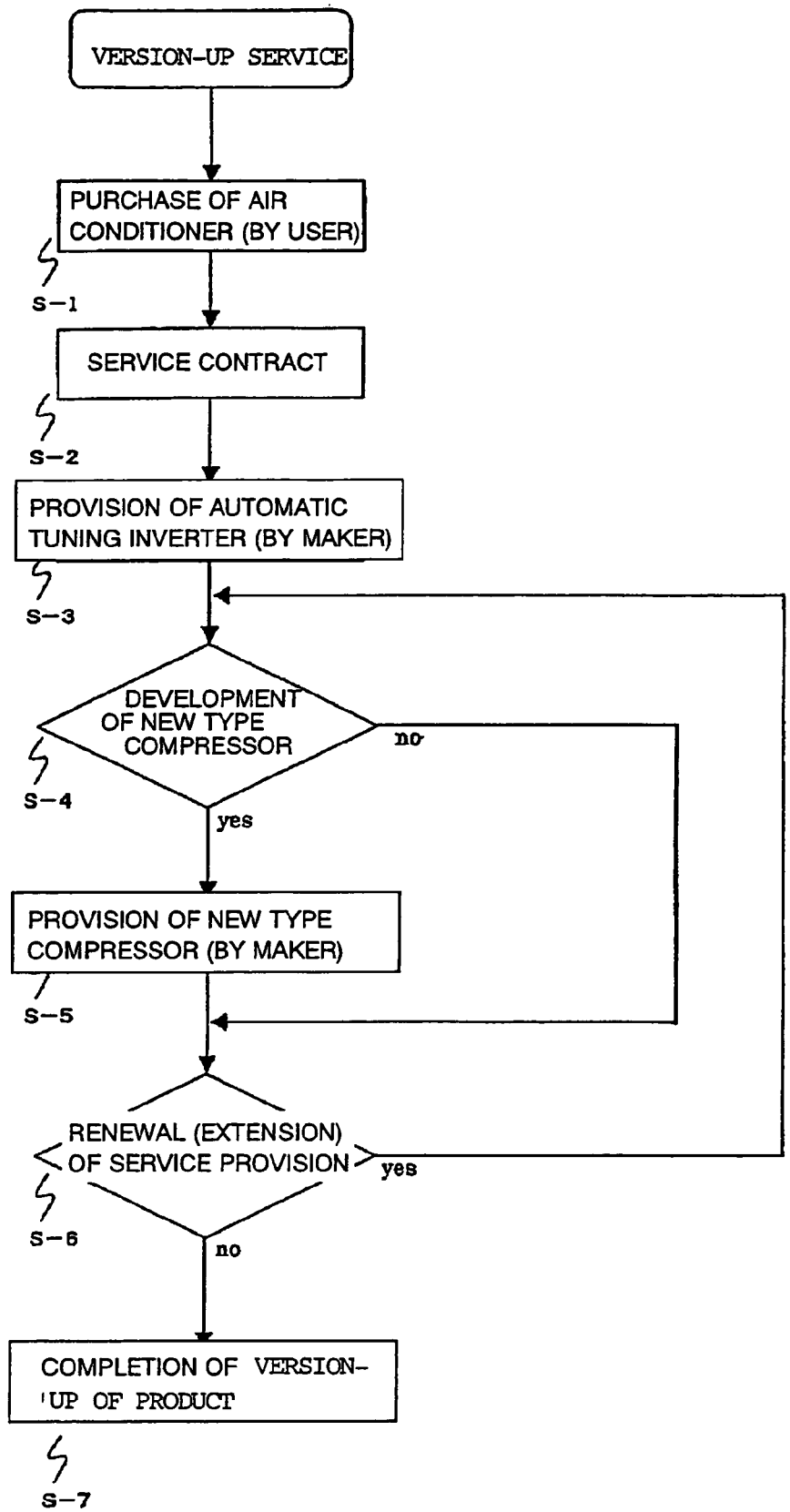
FIG. 3 is a flowchart which explains the flow of the service according to the first embodiment of the present invention.

This embodiment will be described by using a schematic diagram of FIG. 2 and a flowchart of FIG. 3. FIG. 2 is the schematic diagram of a service which expresses a first embodiment of the present invention. FIG. 3 is the flowchart of the service which expresses the first embodiment of the present invention. Referring to FIG. 2, when a user A purchases, for example, an air conditioner 1, the user contracts with a maker B for a version-up service. In this case, if the user A pays a version-up service charge to the maker B, the user A can receive the upgrade service by an exchange of only an inverter circuit 2. Accordingly, the user can exchange the air conditioner for an energy-saving air conditioner at low cost if he wants, because only a compressor 3 is exchanged instead of the whole air conditioner or only an outdoor unit 1.

In FIG. 3, S-1 is a purchasing step of freezing/air conditioning device such as an air conditioner. S-2 is a service contract step in which the user signs a service contract with the maker. After the service contract has been concluded in the step S-2, if the user requires the maker to exchange the air conditioner for the energy-saving air conditioner, the maker carries out the service of replacing an inverter circuit installed in the air conditioner with an inverter circuit for automatic tuning, in an inverter exchange step S-3. Alternatively, at time of putting an inverter circuit with energy-saving control on the market, the maker sounds out the user about an exchange for the energy-saving inverter circuit. When the user agrees, the maker carries out the service of replacing the present inverter circuit with the inverter circuit with the automatic tuning function in the inverter exchange step S-3.

When a new type high-efficient compressor is developed and manufactured, installing the new type of compressor in the existing air conditioner (replacing the compressor with the new type compressor) makes it possible to use the existing air conditioner as a new type high-efficient air conditioner. Thus, whether or not the new type compressor has been developed is checked in a new type compressor check step S-4. When the new type compressor has been developed, the maker offers the new type compressor to the user in a new type compressor offering step S-5, and exchanges the compressor. Then, the maker asks the user whether or not to extend the service contract, in a service contract extension asking step S-6.

When the new type of compressor has not been developed in the new type compressor check step S-4, the maker asks the user whether or not to extend the service contract in the service contract extension asking step S-6. Then, the predetermined version-up service under the service contract is completed in version-up service completion step S-7.

The air conditioner which the user has purchased in the step S-1 has an inverter with an automatic tuning function. Thus, the air conditioner easily operates by only an exchange of the compressor even if the compressor has any specifications. Therefore, the air conditioner operating with the new type high-efficient compressor achieves higher efficiency than before the exchange of the compressor, so that increase in energy saving performance can cause the effect of reducing a power rate to the user. Furthermore, it is possible to prevent waste energy loss, which is greater loss in society.

In FIG. 3, the service contract has an expiration date, and whether or not to extend the service contract is checked in the step S-6. The service contract, however, may not have the expiration date. As a matter of course, the same effect as above is obtained if the service contract has an indefinite expiration date. As the contents of the service contract according to this embodiment, in the case of the flowchart shown in FIG. 3, for example, the user pays the service charge every predetermined time period like an annual fee, and a compressor is exchanged at any time when a new type efficient compressor is developed during the time period.

Figure 13:
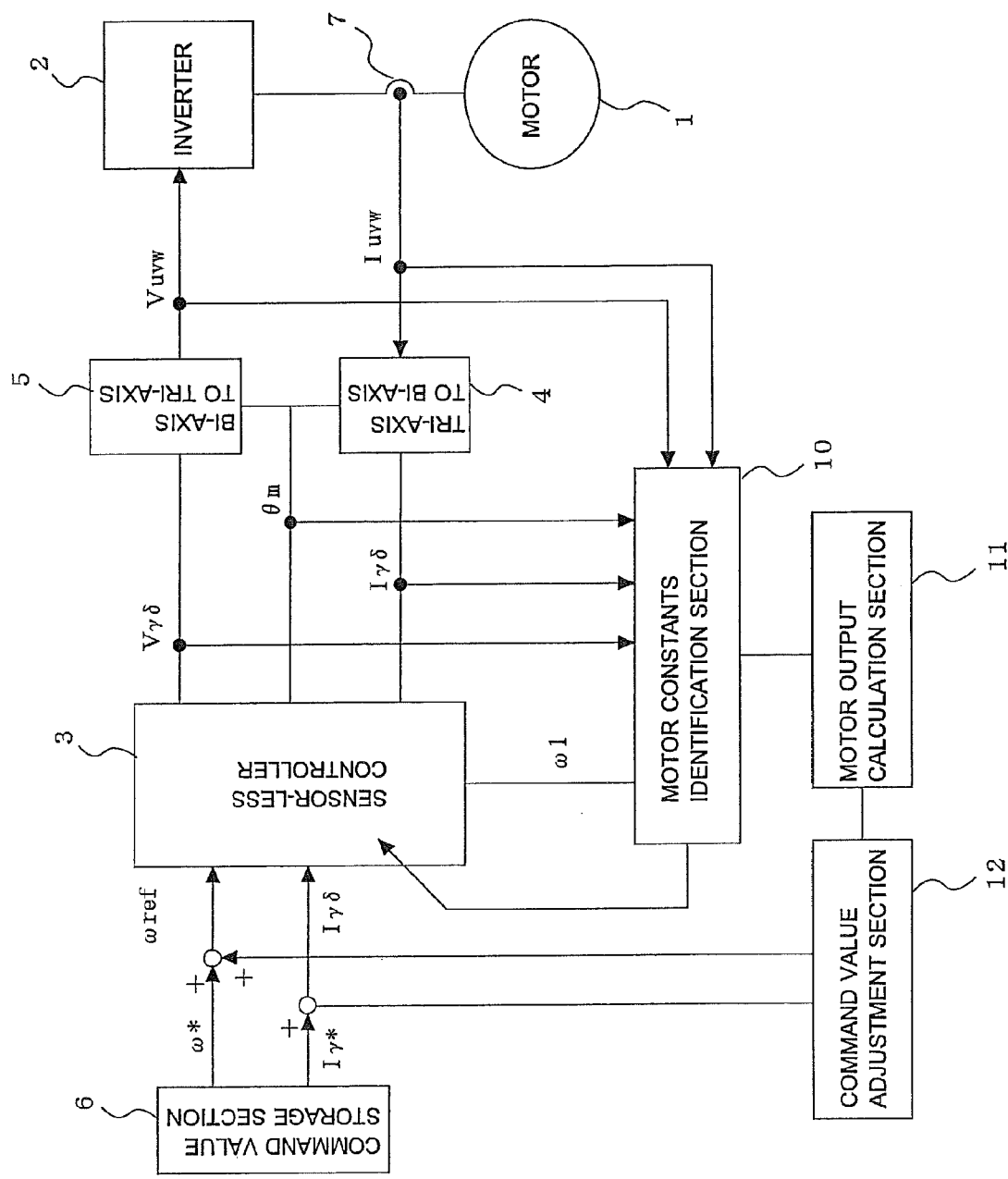
FIG. 13 is another block diagram showing the first embodiment of the present invention.

The automatic tuning function described above not only identifies the constants so as to operate a motor with any specifications, but also identifies the constants so as not to impair the energy saving performance of the permanent magnet motor, in order to realize the optimal operation of the permanent magnet motor. Then, an example of concrete contents of the automatic tuning function will be described with reference to FIG. 13 and the like. FIG. 13 is a drawing for explaining the inverter circuit 2, in which an inverter 22 controls the voltage of electric power from a power source to drive a motor 21 being a permanent magnet motor while controlling the number of revolutions, output, torque, and the like. The motor can be driven by position sensor-less without detecting the rotational position of the motor 21, by use of a signal about an electric current from the motor 21 detected by a current detector 27. The motor constants, however, may be identified by detecting the rotational position. "Identification" and "identify" mean to specify a specific value, and specify the characteristics of the motor itself. An electric current flowing into the motor 21 is converted from three-phase current to biaxial current being a rectangular coordinate system. A sensor-less control section 23 compares the biaxial current with a command value from a command value storage section 23, and outputs biaxial voltage Vrδ, a coordinate transformation angle θm between biaxial and triaxial systems, and an angular velocity ω1 of the motor 21, by using a voltage-current equation of the motor and the like. A motor constants identification section 10 for identifying the motor constants of the motor 21 identifies the resistance component R, the inductance components Ld and Lq, and the counter-electromotive voltage constant ϕ of the motor by the method which has been already described, and outputs the constants to a motor output calculation section 11.

The motor constants used in the inverter circuit 2 of the present invention, as described above, are not values set and fixed in advance. The inverter circuit 2 uses the motor constants which are identified from a value measured before or after the actuation of the motor. In other words, the inverter circuit 2 carries out automatic tuning. The motor output calculation section calculates output for realizing efficient operation. However, it has already been described that the phase current minimizing control of the motor is carried out, the torque of the motor can be expressed by the mathematical expression using the motor constants, and the minimum value of the phase current is obtained by differentiating the current component of the mathematical expression expressing this output torque. A voltage applied to the motor has been determined by its own control, and an electric current has been detected. The input of the motor being the output of the inverter has been known, so that it is possible to calculate motor efficiency. Accordingly, a command value adjustment section 12 automatically adjusts the command value for determining the operating condition of the motor so as to follow a better efficiency point. The torque is calculated by using the motor constants, and the output is calculated from the torque and the number of revolutions. As tips on the efficient operation of the motor like this, there are a method for minimizing electric current at constant output torque at which a copper loss is minimized, contrarily, a method for maximizing the output torque at the constant electric current, a method for maximizing the output torque at the constant number of revolutions and constant motor input, a method for maximizing the ratio between the input and output of the motor by varying the number of revolutions, and the like. The inverter circuit 2 for controlling the motor 21 according to the present invention is composed of a circuit including a control rectifier cell and software such as a program. The circuit controls direct current and converts it to variable voltage, a variable frequency, and the like. The software is set in a CPU of a microcomputer or the like, which is in the sensor-less control section 23 for carrying out control or the like. In the inverter circuit 2, the motor constants identification section 10, the motor output calculation section 11, and the command adjustment section 12 for controlling the automatic tuning are composed of the software set in the microcomputer in a like manner.

In the case of the configuration shown in FIG. 3, there are cases that if the new type of compressor with high performance is not developed during the predetermined period, the compressor is not exchanged even though the service charge is paid, in other words, the service is not offered. Thus, when the compressor is not exchanged during the service period, a service charge for the next year may be reduced.

Instead of the foregoing configuration, another configuration without setting the predetermined period may be adopted. If the service is offered for an unfixed period, that is, a period until the compressor is exchanged for the predetermined number of times, for example, three times, instead of for the predetermined period or an indefinite period, a version-up service method of the compressor described in this embodiment is not disturbed.

Furthermore, without fixing the contract period of the service as described above, the service may be offered until the outdoor unit purchased by the user or the like is broken. If the service contract includes an optional service contract which includes an exchange for the new type compressor for the purpose not only to increase the performance but also to provide against a breakdown, the version-up service method of the compressor described in this embodiment is not disturbed.

Figure 4:
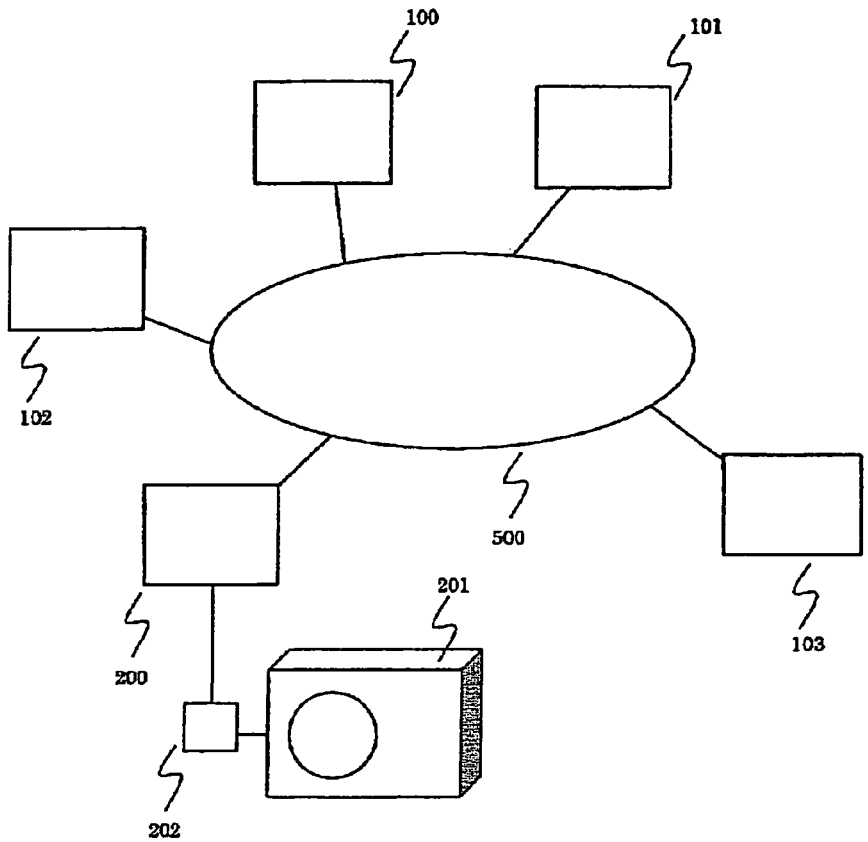
FIG. 4 is a whole block diagram for explaining the service according to the first embodiment of the present invention.

The user may sign only the service contract, and bear the cost of the exchange each time, which occurs in exchanging the compressor. FIG. 4 is the whole block diagram for explaining the service according to this embodiment. An information management center 100 and the user 200 make contact with each other through the Internet 500. The information management center 100 not only concludes the service contract, but also offers information about the completion of a new type compressor and the like to the user 200 who has signed the contract.

The user 200 can inquire of the information management center 100 about the concrete data of a power rate reduction effect (including an estimated effect). The user 200 himself/herself can judge the necessity of an exchange for the new type compressor, and the user 200 may sign the contract on the basis of judgment results.

When an exchange request for the new type compressor is sent from the user 200 to the information management center 100, the information management center 100 orders the new type compressor from a maker 101 which manufactures the new type compressor. The maker 101 sends the new type compressor to a sales office or general merchandise store 102 nearest the user 200. The sales office or general merchandise store 102 delivers the compressor to the user 200, and carries out exchange operations.

It is possible to realize the version-up service method of the compressor by the configuration shown in FIG. 4. In such a case, the service charge may be paid by the sum of reduction in the power rate for a predetermined period. Taking the case of the compressor in the refrigeration cycle of the freezing/air conditioning device like this, a conventional inverter has parameters depending on each motor installed in the compressor, and operates in accordance with an order from the set parameters. The parameters differ from motor to motor. If a compressor with a different motor is connected to the conventional inverter, the motor not only does not efficiently operate, but also does not even rotate. In the air conditioner having the refrigeration cycle in which the automatic tuning inverter is installed, or the like, a motor rotates as a matter of course if only the compressor is exchanged. Also, it is possible to easily operate a compressor after an exchange with high efficiency without special tuning. Therefore, it is possible to realize the version-up service by which an energy saving effect at the level of a air conditioner sold as a new product is expectable in an old machine only by exchanging the compressor. The concrete energy saving effect is disclosed and verified in the system shown in FIG. 4. In this case, if the inverter circuit 2 is a conventional one, it is necessary to add the automatic tuning function, in other words, to add software for, for example, the motor identification section 10, the motor output section 11, the command adjustment section 12, and the like.

The information management center 100 in FIG. 4 is configured so as to collect data (power rates and the like) of operating conditions of the compressor from the time before the exchange (at the time of being purchased). In such a configuration, the power rate reduction effect before and after the exchange is obtained as a numerical value, so that it is possible to collect the sum of reduction in the power rates for the predetermined period. The service charge in this case may be composed of the sum of a basic charge and reduction charge in the power rate in accordance with the power rate reduction effect after the exchange.

The present invention offers the service to the user, who purchases or uses the refrigeration device such as the air conditioner having the inverter with the automatic tuning function. Thus, even if a compressor has a motor that is manufactured by any maker and has any specifications, it is possible to operate the compressor in an optimal state.

Accordingly, to offer the version-up service of the compressor, the information management center 100 and the maker 101 may be the same management group or may be different management groups. In such a case, the group running the information management center 100 may offer only the inverter circuit with the automatic tuning function.

The present invention makes it possible to operate the compressor having the motor with any specifications by concluding the service contract, if the automatic tuning inverter is installed in the air conditioner. It is also possible to realize version-up to the new type compressor with high performance and high efficiency only by exchanging the compressor. The user, whose compressor is exchanged, can obtain reduction in the power rate and obtain the version-up service to the new type compressor at an amount corresponding to the power rate reduction effect for a predetermined period. Alternatively, an electricity supply organization may charge an extra power rate when predetermined efficiency cannot be maintained, or may charge a cut-rate when the predetermined efficiency and performance are maintained.

There is no problem if the service charge is paid by any way, such as a transfer in a bank, a post office or a convenience store, and a direct debit by a credit card by use of a personal computer.

In this embodiment, the automatic tuning inverter is configured so as to identify the motor constants, and optimally operate the motor by following the operating points at which the efficiency of the motor becomes the maximum. Thus, the user can schematically grasp the efficiency of the motor all the time. The user 200 can make the information management center 100 always grasp the operating condition of the air conditioner 201 and the counter-electromotive voltage constant of the permanent magnet motor, by connecting the owned air conditioner 201 to the Internet 500 directly or through an interface (I/F) 202. Thus, it is possible to provide a monitor device, which evaluates its performance and monitors the absence of reduction in the performance.

The interface 202 is an interface for connecting a personal computer to the air conditioner 201, when the user 200 is the personal computer. The interface 202 is an interface for connecting the air conditioner 201 to the Internet 500 with a wire or wireless, when the air conditioner 201 is directly connected to the Internet 500. The air conditioner 201 is necessarily connected to a system (electric power line) for electric power supply, so that the interface may be electric power line communication which sends or receives data by using the electric power line, or the like.

According to this configuration, variation in, for example, the counter-electromotive voltage constant from an eigenvalue at the time of manufacture can be grasped, and hence it is possible to grasp the efficiency of the freezing/air conditioning device such as the air conditioner. By keeping monitoring the efficiency of the freezing/air conditioning device, waste energy loss can be prevented. When the efficiency of the air conditioner is reduced because of reduction in the counter-electromotive voltage constant, it is possible to detect the amount of demagnetization of this compressor. When reduction in the counter-electromotive voltage constant is not detected, the information management center 100 grasps degradation in the performance of the air conditioner 201, and, for example, displays or sends a notice that the performance becomes a predetermined value or less.

When the compressor is demagnetized, the degradation in the performance due to the demagnetization is improved by exchanging the compressor. Thus, it is possible to make a version-up of the compressor from one with degradation performance to one without degradation in its performance. To detect reduction in the performance like this, first, the counter-electromotive voltage constant $\phi$ being one of the motor constants to be identified is a value decided by the magnetic force of the motor. The counter-electromotive voltage constant $\phi$ varies, when the permanent magnet is demagnetized. Since the magnet torque is insufficient in the demagnetized motor, an electric current increases to compensate the torque, so that efficiency is reduced. Detection of the counter-electromotive voltage constant makes it possible to detect the demagnetization. Also when the sufficient amount of flow of a refrigerant circulating through refrigeration cycle pipes cannot be secured due to clogging by sludge or the like, difference in pressure occurs in the compressor but a workload is reduced. Thus, load torque is reduced. In other words, when the performance is not made full use and the load torque is light, the clogging can be detected. When the workload of a fan is reduced because of the clogging of a filter and a heat exchanger or the like, the amount of heat exchange in the heat exchanger is reduced. Thus, there occurs a phenomenon in which the temperature of a room or the like does not vary, even though the load torque of the compressor is heavy and the compressor works. In such a manner, it is possible to detect factors which lead to the reduced performance of the air conditioner or the like, from the output torque of the motor, too.

The degradation in the refrigerating/air conditioning device such as the air conditioner represents, for example, the exhaustion of oil due to clogging by sludge or the wicking of refrigerant oil, the clogging of heat exchanger, the clogging of the filter, the leakage of a refrigerant gas, and the like, and these can be detected in this embodiment. Furthermore, in the case of a refrigerator and a freezer, it is possible to detect, for example, reduction in a heat insulation effect of vacuum insulation and the like. Since information about degradation as described above is sent from the information management center 100 to a maintenance center 103, it is possible to offer a maintenance service such as a check of the cause of degradation in the device. Since the inverter having the automatic tuning function is provided in this embodiment, it is possible to carry out the foregoing maintenance service and version-up service.

By offering the automatic tuning inverter to the user 200, it becomes possible to detect degradation in the performance of the device. The maintenance center 103 performs maintenance and takes measures such as the exchange of the compressor before the air conditioner 201 is broke down and cannot operate, and hence it is also possible to resolve a compliant from the user 200. Also, since it is possible to take measures such as an exchange of the compressor before the breakdown of the air conditioner 201 and the like, this embodiment is useful for improving the reliability of the refrigerating/air conditioning device itself such as the air conditioner. Furthermore, since the automatic tuning inverter is provided, the compressor can be exchanged for a compressor with any specifications. Thus, selection of the compressor is easy, and hence it is possible select an inexpensive compressor.

Also, it is possible to operate a product with grasping the degree of degradation in the performance, which differs from product to product. Thus, it is possible to take measures such as the exchange of the compressor before its condition becomes worse, so that the environmentally friendly product with high recyclability can be offered as part of an energy saving and returning service. Furthermore, in the case of the degradation, breakdown, and the like of the compressor, when time is necessary for exchanging the compressor because a compressor with the same specifications as the broken one is out of stock or the like, a shutdown period is necessary in the conventional inverter. Use of the inverter circuit with the automatic tuning function, however, makes it possible to immediately continue the operation of the air conditioner or the like. A big problem occurs when air conditioning stops in public facilities such as a hospital and a public office, commercial facilities such as a restaurant and a convenience store, an office in a closed building, and the like. Stored food is damaged in a refrigerated warehouse, a showcase, and the like. A cessation of a refrigeration cycle for generating hot water, such as a cessation of hot water supply for a bathroom, a cold district, a floor heating, and the like becomes a problem. The inverter having the automatic tuning function according to the present invention, however, not only identifies the constants so as to operate the permanent magnet motor even if the permanent magnet motor has different specifications, but also can operate the motor immediately after the identification of the constants in such a manner as not to impair the energy saving performance of the motor. In other words, if time is necessary for exchanging the compressor for a new compressor with high performance, the compressor is easily exchanged for any alternative compressor and the alternative compressor is driven by the automatic tuning. The alternative compressor is collected when the compressor is exchanged for the new compressor, so that it is possible to prevent the occurrence of a problem situation of the cessation of the refrigeration cycle. It is also possible to provide such temporary operation as one of services. In other words, if an old compressor driven by any motor for circulating a refrigerant of a refrigeration cycle has to be replaced with a new compressor due to various reasons such as measures against breakdown in the case of an emergency and measures for version-up, a combination of an inverter having the automatic tuning function and a synchronous motor is provided as an alternative. After a test drive for evaluating operation specifications, the motor is operated by the automatic tuning. Therefore it is possible to realize a service, by which the compressor is temporality used until the new compressor is used. In this alternative operation, the inverter prevents a malfunction such as reduction in efficiency.

The degree of degradation in the performance of the foregoing device may be detected to inform the user of it by providing an alarm or an indicator lamp or the like. Alternatively, the degree of degradation in the performance may be stored in a CPU of the inverter, or displayed in the inverter. In this CPU, the identified motor constants and the like are readably stored.

As described above, there are an operating specifications evaluation step, an efficiency grasping step, and an efficiency reduction report step. In the operating specifications evaluation step, a driving device including the inverter which can identify the motor constants of the permanent magnet motor is provided for a customer who has already purchased or will purchase the compressor with the permanent magnet motor, or a customer who will purchase or sell the product with the motor. The driving device drives the motor such as the permanent magnet motor installed in the compressor, and extracts the motor constants of the permanent magnet motor such as the counter-electromotive voltage constant. In the efficiency grasping step, the efficiency of the product in which the compressor with the permanent magnet motor is installed is grasped from variation in the motor constants of the permanent magnet motor obtained in the operating specifications evaluation step. In the efficiency reduction report step, the timing of exchanging the compressor is reported, when the efficiency of the product obtained in the efficiency grasping step is reduced. The timing of exchanging the compressor can be reported on the basis of the degree of reduction in the efficiency of the product obtained in the efficiency reduction report step, and the compressor is exchanged based on it. Thus, it is possible to exchange the compressor before reduction in the efficiency (performance). It is possible to provide the energy-saving product with high performance (high efficiency, low noise, and the like), and therefore it is possible to prevent waste loss in society.

Also, when the efficiency obtained in the efficiency grasping step is reduced, the user, the maker, or the like is notified by notification means such as the alarm, the indicator lamp, or the like. Therefore, the user, the maker, or the like can immediately grasp the timing of exchanging the compressor, and hence early cope with it.

This embodiment as described above is described in the form of the energy saving service. The version-up service of the compressor is not limited to the energy saving service. When, for example, a new type of compressor can realize noise reduction, it is possible to realize the version-up to low noise by exchanging the compressor. If the compressor is exchanged for a compressor with the maximum performance increased, it is possible to realize the version-up of the air conditioner, the refrigerator, and the like in accordance with a request of the user such as quick cooling and the extension of heating performance.

Since the refrigeration cycle according to the present invention has the automatic tuning function, it is possible to cope with the exchange of only the compressor because of change to a refrigerant with small ozone depletion potential. Pipe cleaning for the change of the refrigerant may be combined into a refrigerant change service. The refrigerant change service of the refrigeration cycle like this becomes one of the version-up services, so that serviceability is further improved.

In the service provision described in FIG. 4, the compressor may be exchanged by the notification from a service provider or the information management center 100, or the compressor may be exchanged by the notification from the user 200. Although it is not illustrated in FIG. 4, the service such as the exchange of the compressor may be carried out by the notification from a patrolman, a service person, or the like of device maintenance who uses a mobile Internet access device such as a portable terminal. The version-up service according to this embodiment is not prevented in any timing.

Furthermore, the inverter of the sine wave drive is used in this embodiment. In the case of the waveform of the rectangular wave drive shown in FIG. 1(*a*), as described above, the inverter does not need to be the automatic tuning inverter in exchanging the compressor, even if the compressor has any specifications. When the compressor corresponding to the sine wave drive is driven by the rectangular wave drive, however, there is a possibility that maximum output is insufficient. This is because the motor corresponding to the sine wave drive can be designed so as to have large V/f (V represents the direct-current voltage of the inverter, and f represents a frequency). The compressor corresponding to the sine wave drive is designed so as to have larger V/f than the compressor for the rectangular wave drive, to increase efficiency.

In the case where V/f is largely designed, f (represents the number of revolutions of the motor) necessarily decreases if V (represents the direct-current voltage of the inverter) is constant. It is apparent from a mathematical expression that if constant V is divided by large V/f, left f becomes small.

Accordingly, when the compressor which is developed so as to correspond to the sine wave drive is driven by the rectangular wave drive, the maximum output is insufficient. A cause of it is reduction in the maximum number of revolutions. An insufficiency of the maximum output causes problems of slow cooling in a cooling device, and slow heating in a heating device in the case of an air conditioner. Thus, there is a possibility that the product specifications are not satisfied when the motor corresponding to the sine wave drive is driven by the rectangular wave drive inverter, so that the compressor is difficult to exchange. Also, since the compressor driven by the sine wave is made practicable, the compressor is exchangeable for a compressor of the sine wave drive with any specifications, provided that the inverter having the automatic tuning function is installed.

Accordingly, this embodiment focuses attention on the automatic tuning function which has brought about less return cost and merit to the user, to offer service such as the version-up service of the compressor, and measures in terms of preventing waste in the whole social equipment such as a factory, a building, a community, and the like. Use of the automatic tuning function as one of the services to each user makes it possible to offer the user the energy saving technology at low cost, and furthermore offer an emergency measure service.

Figure 5:
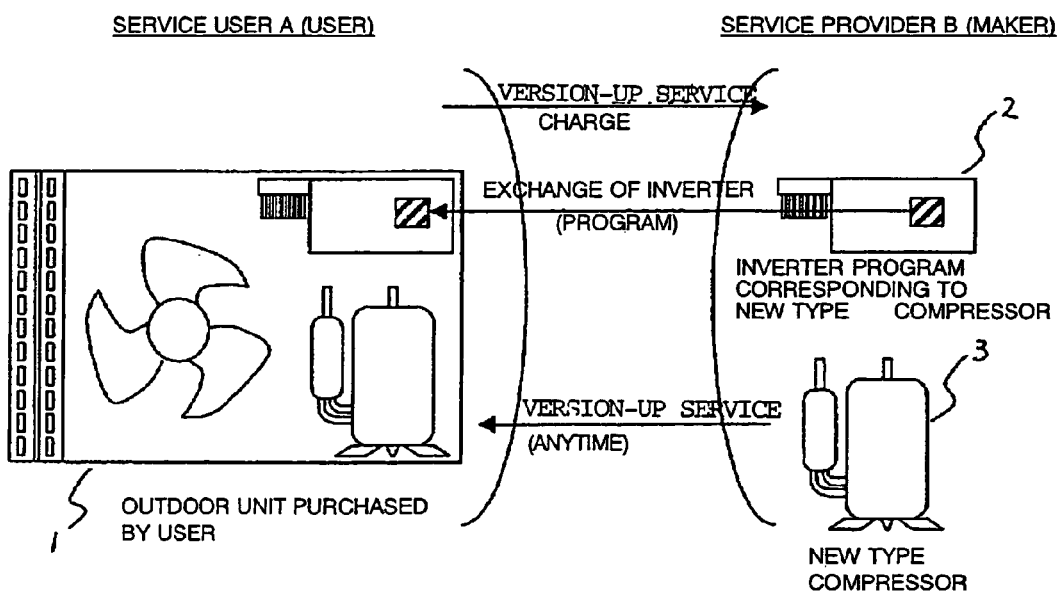
FIG. 5 is a whole block diagram which explains the flow of another service according to the first embodiment of the present invention.

The automatic tuning inverter is provided (step S-3) in the flow of FIG. 3, but as shown in FIG. 5, only an inverter program corresponding to a new type of compressor may be provided with the new type of compressor in a service. FIG. 5 is a whole block diagram which explains another service according to the first embodiment of the present invention. As shown in FIG. 5, the maker B may provide only the inverter program for the user A who has concluded the version-up contract. The energy saving in the freezing/air conditioning device such as the air conditioner due to the exchange of the compressor can be also realized in such a manner. As a matter of course, an effect of the energy saving due to the version-up of the compressor is returned to the user by carrying out a similar service to the above. In the case where software is offered in this manner, only the software of an automatic tuning function part is added, so that the service can be offered in the most inexpensive form.

In the case of a service for offering an inverter program with further better performance, software may be provided upon a first contract, or H/W may be sent as an automatic tuning inverter. Only a new program may be distributed through the Internet from then on. Particularly, in this case, a rewritable flash memory may be mounted on a CPU of the automatic tuning inverter H/W having been sent first, to easily realize the service. The user easily rewrites the program only by connecting the air conditioner or the like to a personal computer via an interface for rewriting.

Furthermore, this embodiment describes the return service of the energy saving, but this embodiment is not limited to the return service of the energy saving. During the development of a compressor which has been developed year after year based on users' requests, for example, there is a case where an inverter corresponding to the compressor has not been completed. In such a case, there is no problem if the newly developed inverter is provided for verification. In this embodiment, the compressor can easily operate if the compressor is exchanged. Thus, the verification can be easily carried out in short time, and hence it is possible to shorten a development period and lighten a development load. There is no problem in such a service for lightening the development load.

The compressor is described above, but this embodiment is not limited to the compressor. The same services can bring about the same effects for an apparatus in which a permanent magnet motor is driven by the position sensor-less, such as a pump motor for pumping up water, as a matter of course.

Furthermore, the services use the inverter having the automatic tuning function of the permanent magnet motor. In a motor which cannot be driven when its motor constants are unknown, that is, for example, a synchronous motor such as a switched reluctance motor and a synchronous reluctance motor, it is possible to realize the same services as above and bring about the same effects by using an inverter having an automatic tuning function of the motor, as a matter of course. In this case, the automatic tuning function has the function of identifying the motor constants of the motor.

Figure 6:
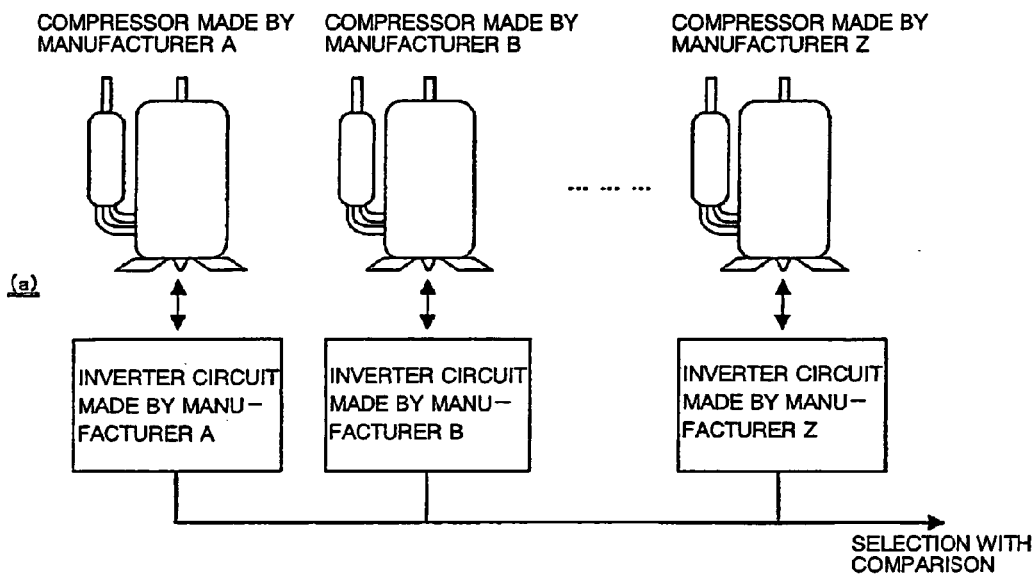
FIG. 6 is another explanatory schematic diagram which explains the flow of the service according to the first embodiment of the present invention.
Figure 6:
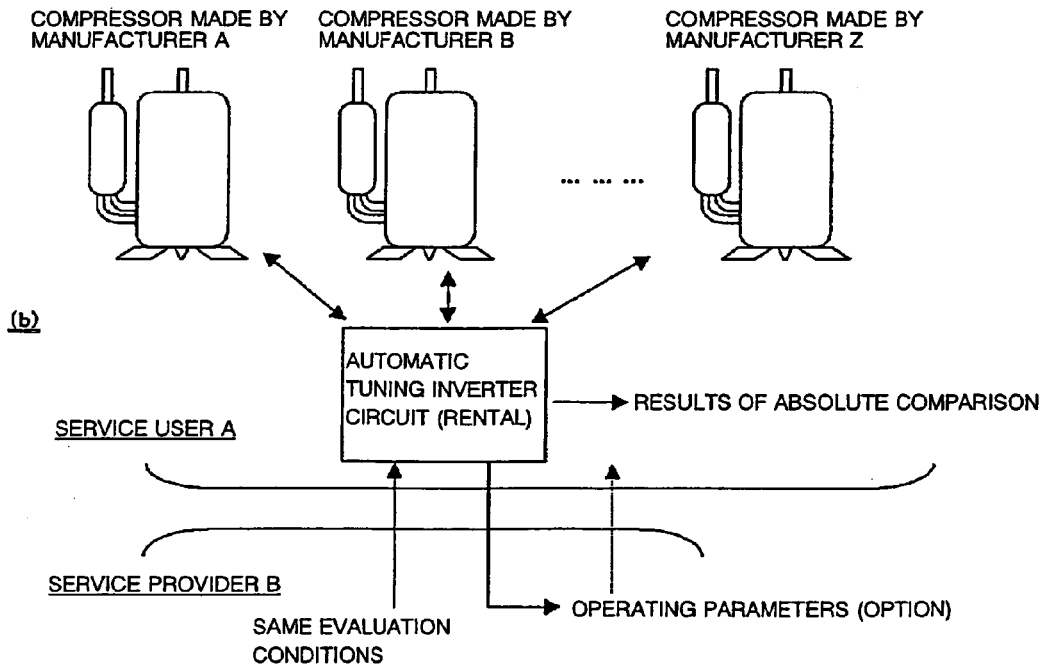
Figure 7:
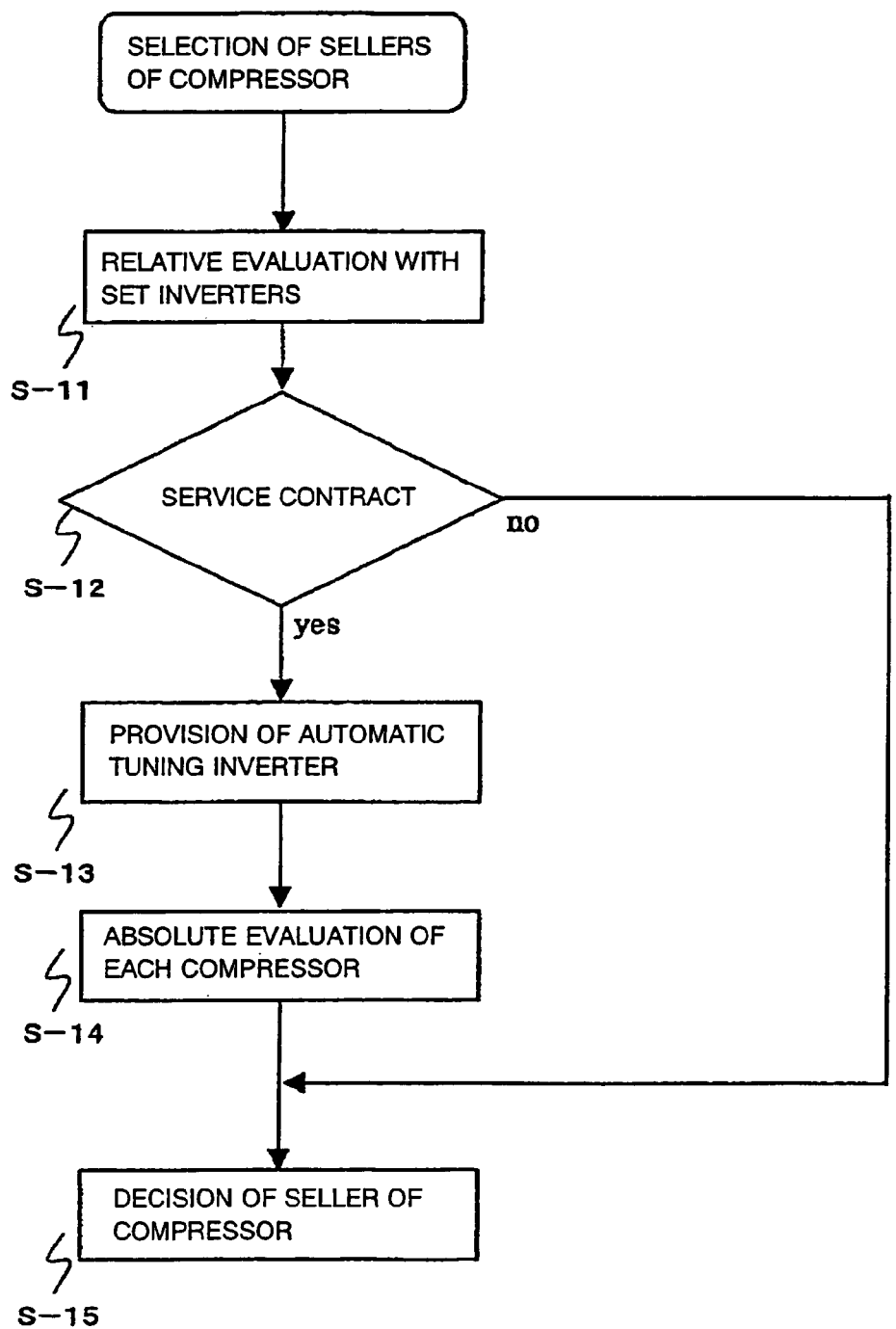
FIG. 7 is another flowchart which explains the flow of the service according to the first embodiment of the present invention.

FIG. 6 is another explanatory schematic view which explains the flow of a service according to the present invention. FIG. 6(a) is a view for explaining a mode of a conventional service, and FIG. 6(b) is a view for explaining a mode of a service according to this embodiment. FIG. 7 is a flowchart which explains the flow of the service according to the present invention.

There are two types of makers of manufacturing an air conditioner. One is a maker of manufacturing a compressor by itself, and the other is a maker of purchasing a compressor from another maker instead of manufacturing it. The maker of manufacturing the compressor by itself (hereinafter called a sales maker) sells the compressor to another maker. The maker of purchasing the compressor (hereinafter called a purchase maker) evaluates the compressor provided from each sales maker, and selects the compressor to be adopted.

The sold compressor on which a permanent magnet motor is mounted is generally provided with a sample of an inverter as a set. Particularly, when the compressor corresponding to the sine wave drive is operated for evaluation, the inverter provided as a set for the sold compressor is used in most cases. Alternatively, an inverter which can drive the compressor provided from each sales maker is separately purchased. Otherwise, the purchase maker itself has to manufacture on trial and actually manufacture an inverter.

Suppose that the purchase maker itself build a prototype of an evaluation inverter for comparatively evaluating the newly purchased compressors (the evaluation inverter with specifications which can drive every compressor to be evaluated). In this case, it often takes much time to adjust parameters until the compressor is operated. Thus, there are many cases that substantial time for comparative evaluation becomes insufficient.

Also, when the inverter provided as a set for the compressor operates each of the compressors to comparatively evaluate the performance data of each compressor, the comparative evaluation is not carried out in the same conditions because the inverters are different.

This embodiment of the present invention aims to provide a service by which an inverter with an automatic tuning inverter function is provided for a maker of manufacturing a product with a purchased compressor. By providing the automatic tuning inverter, absolute evaluation is made possible by the same inverter circuit.

FIG. 6 will be described. FIG. 6(a) shows a state of conventional comparative evaluation by using combinations of a compressor and an inverter provided as a set, as described above. In the case of FIG. 6(a), there is no problem if the inverter is purchased together with the compressor as a set.

However, there is a maker which does not sell the inverter and only sells the compressor. Considering the case where only the compressor is purchased later, evaluation by using an inverter provided as a set for another compressor is not carried out under the same conditions, and becomes a problem.

When only the inverter is manufactured by a maker itself, the inverter manufactured by itself has to have the same performance as the inverter provided as a set for the compressor. Thus, there is a possibility that the compressor cannot output desired performance with the inverter manufactured by the maker itself. This is because of difference in know-how in parameter adjustment, and there are few makers selling the know-how. Accordingly, there is a possibility that the evaluation results with the inverter provided as a set are different from those with the inverter manufactured by itself, and hence it takes much time to evaluate the evaluation results.

Furthermore, there is a problem that comparison from the input of power supply cannot be performed when the provided sample inverter has excessive specifications and extremely high efficiency. Particularly in the case of the compressor using the permanent magnet motor, its energy saving performance is expected. However, it is considered that the efficiency of the compressor and a noise level may be largely different because the provided inverter is different. The main items of the evaluation are efficiency and noise in particular, but maximum performance, operative minimum output, and the like could be the objects of the evaluation.

The efficiency of the permanent magnet motor (conversely, loss) is divided in two, that is, a copper loss (I2R) caused by an electric current I flowing through the motor, and an iron loss occurring in a section of iron used in the motor. A balance between two losses is important for the efficiency of the motor. There are many cases that the most efficient operating point of the motor does not become the least current point (a minimum point of the copper loss).

This is because the motor has the iron loss, and loss of the motor is the sum of the iron loss and the copper loss. The inverter for driving the motor, on the other hand, is mainly composed of semiconductors, so that its efficiency generally becomes the best at the least current point (a minimum point of the copper loss).

Accordingly, the efficiency of the inverter becomes bad even at the most efficient operating point of the motor, and there are cases where the most efficient point of the power supply input being the total efficiency of the motor and the inverter does not coincide with the most efficient point of the motor. Thus, in the case of the compressor which cannot operate without the inverter, evaluating the efficiency of only the compressor excluding the inverter could be meaningless. Therefore, it is an extremely large problem in carrying out efficiency evaluation that efficiency from the power supply input cannot be compared.

In this embodiment, as shown in FIG. 6(*b*), the sold compressors are operated with the same inverter. The inverter with the automatic tuning function realizes comparative evaluation in a state near a mode of a product in which an input point of power supply is assigned to a starting point (under the same conditions). Accordingly, since efficiency evaluation is carried out with the inverter having the automatic tuning function, obtained efficiency evaluation results are the same as those with the inverter manufactured by the maker itself.

In a final mode, if the automatic tuning inverter which can evaluate the efficiency under the same conditions in particular is provided for the maker which purchases only the compressors and manufactures the inverter by itself, the purchase maker can eliminate the need to built a prototype of an inverter only for the evaluation. Therefore, it is possible to shorten development time and reduce cost for manufacturing a prototype.

Accordingly, in this service contract, the compressor purchase maker which needs the automatic tuning inverter is a user of the service, and a maker providing the automatic tuning inverter is a provider of the service. The user of the service pays cost for the service by means of direct debit, money transfer, or the like, and the provider of the service provides the automatic tuning inverter and an operation method thereof.

Furthermore, if a service for providing parameters adjusted by the provided automatic tuning inverter is added to the service as an option, the maker which is provided with the service of the automatic tuning inverter can eliminate the load of parameter adjustment, which takes much time. Alternatively, since approximate values of the parameters are known, it is possible to lighten the load of development for the parameter adjustment, and hence it is possible to further shorten the development time on the user of the service.

The service of lending the inverter circuit with the automatic tuning inverter function has been described above, but the same effect as above is obtained as a matter of course if the inverter circuit is sold instead of being lent.

Furthermore, procedure for the service according to this embodiment will be described with reference to FIG. 7. In FIG. 7, step S-11 is a relative evaluation step in which the compressors are relatively evaluated by using the inverters purchased together with the compressors in sets. Step S-12 is a service contract confirmation step in which it is confirmed whether or not the service contract with a maker to provide the automatic tuning inverter provider is concluded. Step S-13 is an inverter offering step in which the automatic tuning inverter is offered, if the service contract has been concluded at the service contract confirmation step S-12.

Step S-14 is a compressor absolute evaluation step in which an absolute evaluation of each compressor is carried out by use of the automatic tuning inverter offered in the step S-13. Step S-15 is a compressor supplier decision step in which the optimal compressor is selected based on the evaluation data of the inverter and compressors by the absolute evaluation in the step S-14, to decide a sales maker of the compressor as a supplier.

In the procedure of evaluation shown in the flowchart of FIG. 7, each compressor (a compressor made by a maker A, a compressor made by a maker B, and the like as shown in FIG. 6(*a*)) is evaluated (S-11) with the inverter corresponding to each compressor, provided as a set (an inverter made by the maker A, an inverter made by the maker B, and the like shown in (a) of figure) before providing the service. After concluding the service contract (S-12), the automatic tuning inverter is provided (S-13), and the absolute evaluation is carried out (S-14) under the same conditions by using the identical inverter. After that, the compressor which achieves optimal efficiency, an optimal operating range, and the like may be purchased (S-15). By doing so, waste does not occur in the evaluation, and development is efficiently carried out. Therefore, it is possible to shorten development time. Any procedure is available instead of the procedure described above. The procedure is carried out depending on evaluation criteria of the user of the service, and FIG. 7 is just an example as a matter of course.

Furthermore, since a pressure differs according to a refrigerant in the case of the compressor, there are cases where the performance of the compressor differs even though the motor is identical. A refrigerant having no ozone depletion potential, or a refrigerant having small global warming potential have received attention due to change in environmental consciousness in recent years. When the refrigerant is changed, however, the pressure of the refrigerant in the system differs. Therefore, it is necessary not only to change the design of the compressor itself, but also to change a manufacturing line.

Accordingly, it is assumed that a maker, which has manufactured the compressor by the maker itself so far, but will use a purchased compressor in the future, emerges in accordance with the change of the refrigerant. The offer of the service for providing the automatic tuning inverter to such a maker makes it possible to carry out the absolute evaluation of the compressors, which could not be driven because of the difference of the refrigerant, under the same conditions. Therefore, it is possible to shorten development time and reduce development cost.

The service for the purchase maker of the sold compressor has been described above. The service, however, is not limited to the service for the purchase maker of the sold compressor. During the development of a freezing/air conditioning device such as an air conditioner, which has been developed year after year, for example, a final inverter has not been completed, so that there is no problem if the inverter is provided for comparative verification between a previous product and a new product with the identical inverters. In this case, the absolute evaluation under the same conditions becomes possible.

Furthermore, this embodiment has an effect that performance such as noise, maximum capacity, and minimum output can be evaluated under the same conditions in addition to the efficiency.

As to noise, for example, the noise of a product has to be evaluated in a state near a final product. If a problem is found in the state near the final product, however, modification is quite difficult. Accordingly, it is desired to confirm that the noise is on a level without a problem in the final state, in advance before the final state.

In such a case, if the evaluation of the noise under the same conditions and evaluation by a change of only the previous and new compressors are realized, it is possible to grasp a relative level of the compressor itself between the previous and new products before the final state. In the case where the compressor is driven by the sample inverter provided from the sales maker, when the sample inverter from the sales maker has excessive specifications, the relative level evaluation of a noise level cannot be carried out because the inverters are also different. Accordingly, if the inverter with the automatic tuning function described in this embodiment is available, it is possible to evaluate noise under the same conditions before the final state.

Much the same is true on the maximum capacity and the minimum output. The maximum capacity is the maximum output of the refrigeration cycle in a state that the compressor is installed. When the maximum capacity is reduced, the specifications of the product are lowered in such a manner that the heating ability at low temperatures is reduced in the case of an air conditioner. When the minimum output is increased, the specifications of the product are also lowered in such a manner that the air conditioner cools air too much in summer. Therefore, evaluation of the products under the same conditions before the final state has great significance. Also in this case, if the inverter with the automatic tuning function described in this embodiment is available, it is possible to evaluate the performance and output under the same conditions before the final state.

In the case of the compressor using the permanent magnet motor, as described above, the inverter is necessary for carrying out the evaluation verification of the performance (efficiency, capacity, noise, and the like) of different compressors. Furthermore, it is preferable to use the identical inverters. This embodiment can offer the service meeting such needs.

The compressor has been described above, but the embodiment is not limited to the compressor. As a matter of course, the same service can offer the same effect in an application in which the permanent magnet motor is driven by the position sensor-less, such as a pump motor.

Figure 8:
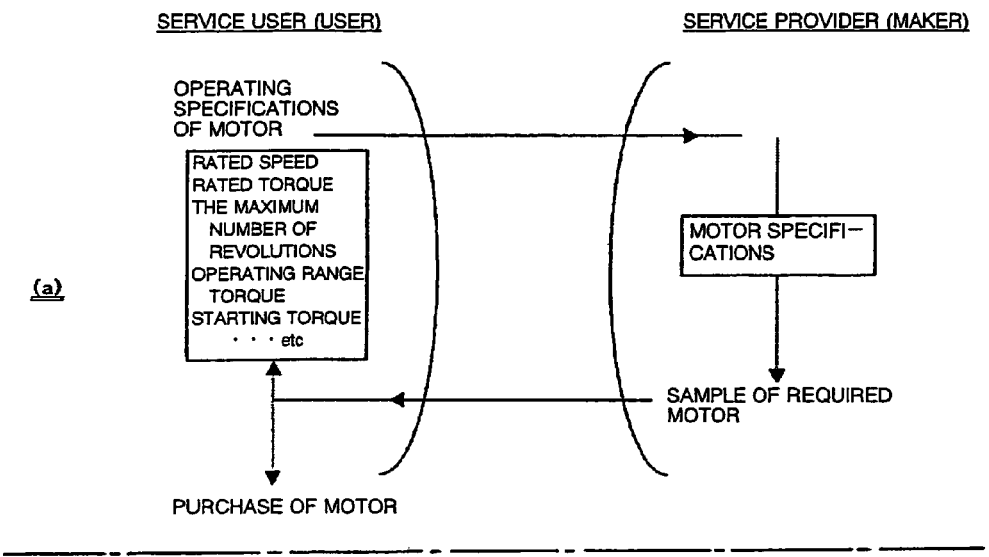
FIG. 8 is further another explanatory schematic diagram which explains the flow of the service according to the first embodiment of the present invention.
Figure 8:
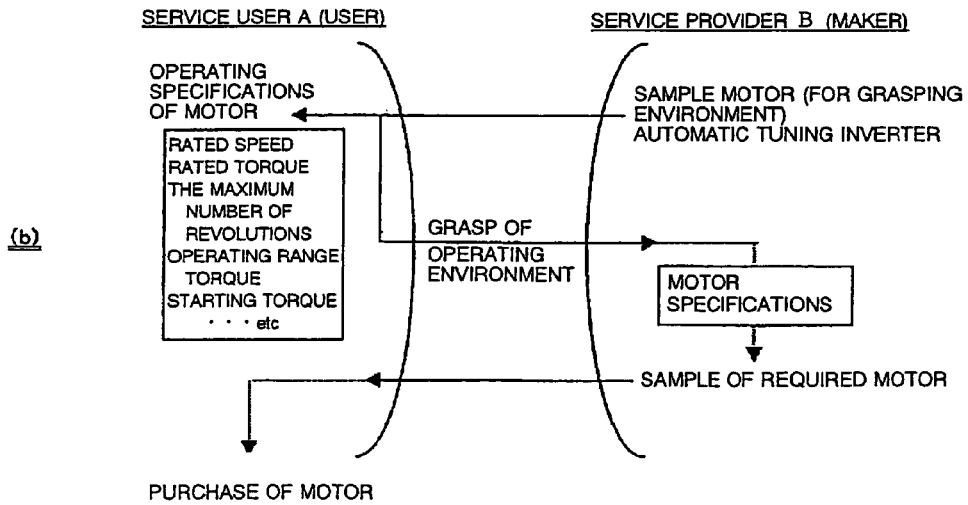
Figure 9:
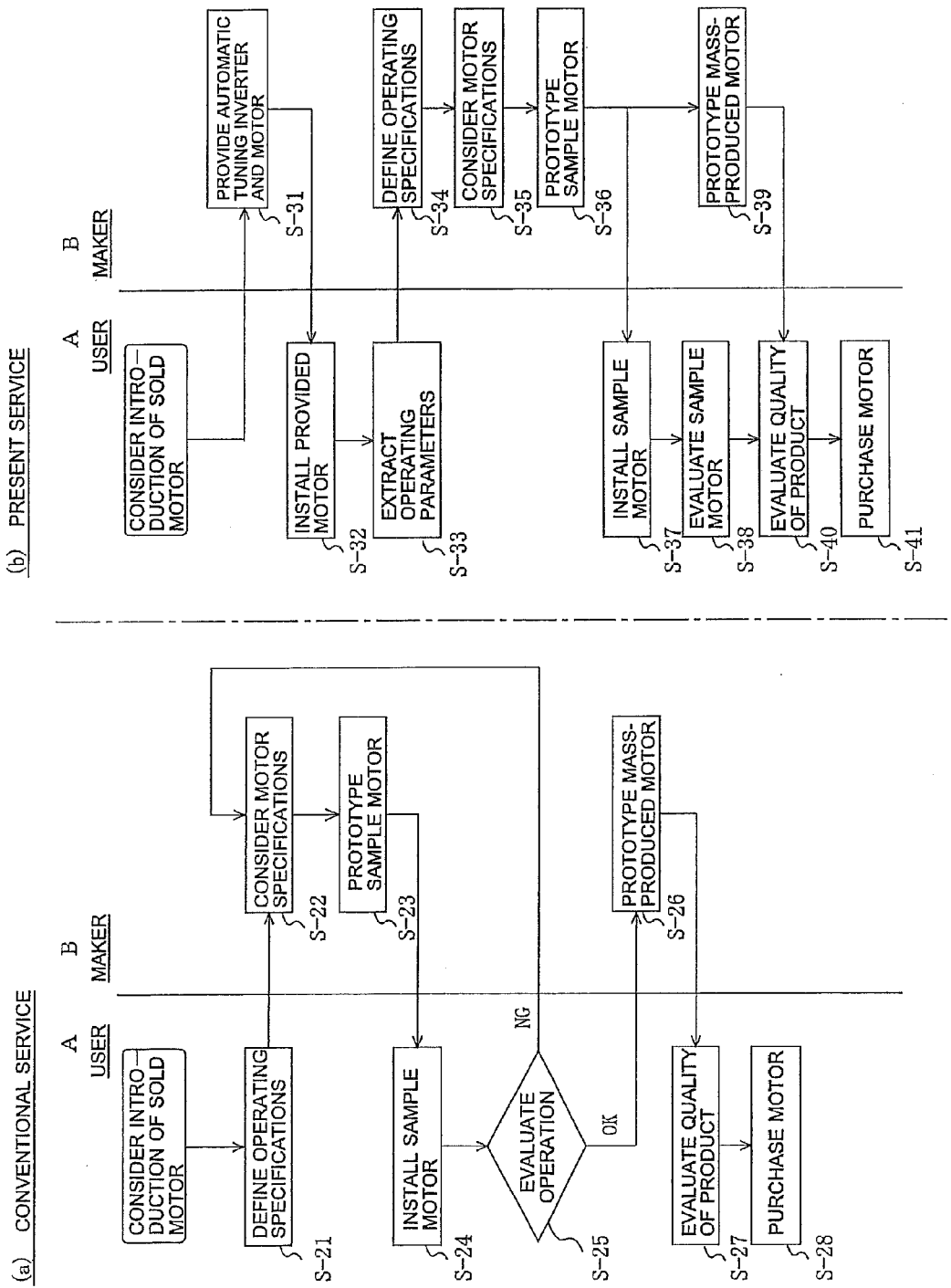
FIG. 9 is further another flowchart which explains the flow of a service contract according to the first embodiment of the present invention.

FIG. 8 is another explanatory schematic diagram which explains the flow of a service according to the present invention. FIG. 8(a) shows a conventional service, and FIG. 8(b) shows a service according to this embodiment. FIG. 9 is a flowchart which explains the flow of a service contract. FIG. 9(a) is a flowchart explaining the flow of the conventional service, and FIG. 9(b) is a flowchart explaining the flow of the service according to this embodiment.

In the drawings, a user A being a user of the service is a manufacturer which purchases a permanent magnet motor (hereinafter called motor), and installs the purchased motor in a product manufactured by itself. The manufacturer is, however, called the user in this embodiment. The user A has to install the motor the operating specifications of which are considered, following the specifications of the product, in which the motor is installed. The operating specifications refer to, for example, rated speed, rated torque, the maximum number of revolutions, operating range torque, starting torque, and the like as shown in FIG. 8(a).

However, there are cases where the operating specifications of the motor can be theoretically designed in general, but in most cases it is impossible to finally decide the operating specifications of the motor without completing a prototype of a product, in which the motor is installed, and actually operating it. Thus, the product in which the motor is installed is completed by repeating a circulation in which a sample of an approximately designed motor is installed in a real product, and whether or not the product satisfies the specifications is evaluated in that state, and when evaluation results are not satisfied a redesigned motor is installed in the product for evaluation.

Flows from step S-21 to step S-25 of FIG. 9(a) show the foregoing state. In the drawing, S-21 is a product specifications decision step in which the user A considers the specifications of the product. S-22 is a motor specifications consideration step in which the maker B considers the specifications of the motor to be installed. S-23 is a sample motor trial manufacture step in which the maker B builds a prototype of a sample motor. S-24 is a sample motor installation step in which the user A installs the sample motor in the product. S-25 is a sample motor evaluation step in which the user A evaluates the operation of the sample motor. S-26 is a motor trial manufacture for mass production step in which the maker B builds a prototype of the motor to be installed in the product, if evaluation results from the user A are OK in the sample motor evaluation step S-25. S-27 is a production evaluation step in which the user A evaluates the product with the motor prototype built for mass production. S-28 is a motor purchase step in which the user A purchases the motor.

In the operating specifications considered in S-21, in particular, in the operating specifications of the motor, an actual working point of torque condition often does not coincide with a theoretically estimated value thereof, because of inconsistency between the theoretically estimated value and an operating point in actual use. Thus, the operation evaluation step S-25 of FIG. 9(a) becomes NG, and hence steps S-22 to S-25 are repeated. It becomes necessary to build prototypes over and over again, and development time becomes long. Therefore, the cost of the product is increased.

After that, if evaluation in S-25 is OK, the maker B which provides the motor builds a prototype of the motor with mass production specifications, a shape and the like of which are profitable for the maker, while meeting the specifications (S-26). After the user A finally evaluates the product (S-27), the motor is purchased (S28).

Then, the service according to the present invention will be described with the use of the schematic diagram of FIG. 8(b) and the flowchart of FIG. 9(b). This service is provided on the condition that the operating specifications of the motor have been considered and specified by the maker B, which provides the motor. In the drawing, S-31 is an inverter and motor provision step in which the maker B provides an automatic tuning inverter and a motor for verifying specifications. S-32 is a motor installation step in which the user A installs the provided motor in a product. S-33 is an operating parameters extraction step in which the user A extracts the operating parameters of the motor.

S-34 is an operating specifications definition step in which the maker B defines operating specifications. S-35 is a motor specifications consideration step in which the maker B considers motor specifications. S-36 is a sample motor, provision step in which the maker B provides a sample motor. S-37 is a sample motor installation in the product step, in which the user A installs the sample motor in the product. S-38 is a sample motor evaluation step in which the user A evaluates the sample motor. S-39 is a trial manufacture of sample motor for mass production step in which the maker B builds a prototype of the sample motors for mass production. S-40 is a product quality evaluation step in which the user A evaluates the quality of the product in which the sample motor is installed. S-41 is a mass-produced motor purchase step in which the user A purchases mass-produced motors.

First, the user A being a user of the service receives the sample motor and the automatic tuning inverter for grasping operating environment from the maker B being a provider of the service (S-31). The user A of the service installs the provided motor in a prototype of the product in which the motor is to be installed (S-32), and operates the product. At this time, the automatic tuning inverter has the function of adjusting parameters in accordance with a motor operating condition. Thus, it is possible to grasp the motor operating condition by operating the product. In particular, starting torque on startup, rated torque on rated operation, operating range torque, and the like can be grasped (S-33).

Use of the automatic tuning inverter makes it possible for the user A to extract operating parameters, so that it is possible to grasp operating specification values coinciding with the actual operation of the product (S-34). The maker B can design the motor on the basis of the operating specifications (S-35). Thus, the maker B builds a prototype of the motor designed on this condition (S-36). The user A installs the built sample motor in the product (S-37), to evaluate its operation (S-38).

Conventionally, there are cases that the operating specifications do not coincide with an actual situation (the actual operation of the product), even though the operating specifications are defined. Thus, the motor is redesigned and manufactured on trial over and over again. By offering this service, however, as shown in FIG. 9(b), it becomes possible to build a prototype of the motor which coincides with the actual operation of the product at its first try. Therefore, it is possible to eliminate waste development time by a repeated loop, and waste development cost.

Also, the maker B can consider final mass product specifications, while the user A evaluates the motor provided as a sample (S-38). This is because the automatic tuning inverter has grasped the operating condition. The operating condition does not change without change in the product, so that it is not necessary to change the specifications of the motor. Conventionally, as shown in FIG. 9(a), a flow cannot advance to the consideration of the mass production specifications (S-26), unless the evaluation results in S-25 are OK. Thus, comparing a conventional example (FIG. 9(a)) with the present embodiment (FIG. 9(b)), the present embodiment can shorten development time in the consideration of the mass production specifications (S-26 and S-39). Furthermore, in the present embodiment, it is possible to evaluate the product with the prototype motor near a final state (S-40), and purchase the motor (S-41).

In the foregoing case, if a user A which has conventionally used an induction motor uses the service, the user A becomes the user A of the service. When the user A replaces the induction motor with the permanent magnet motor for energy saving, the user A receives the provision of this service.

Figure 10:
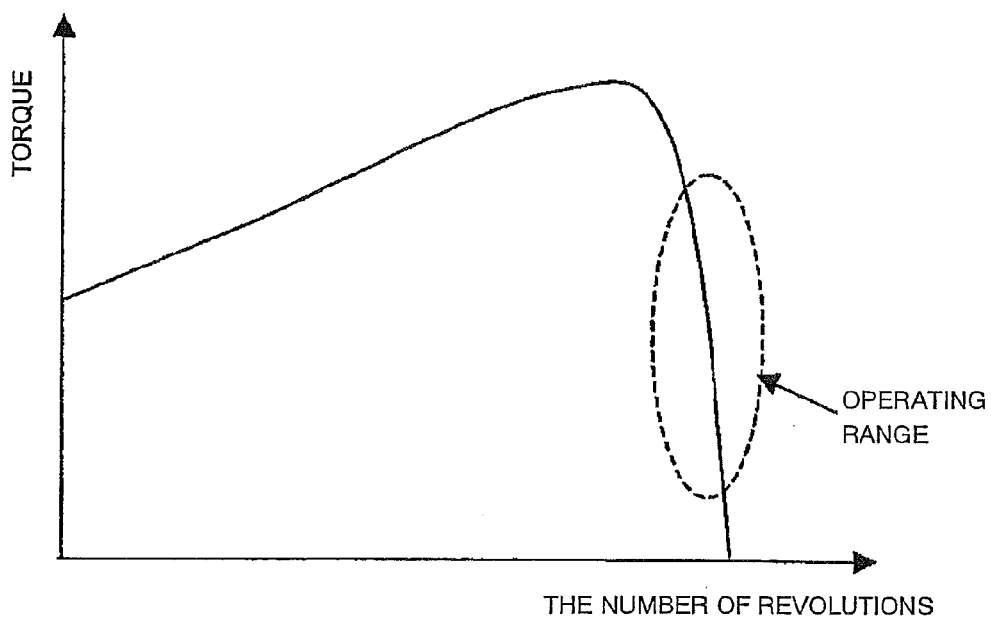
FIG. 10 is a graph showing the relation between the number of revolutions and torque in an induction motor, which is explained in the first embodiment of the present invention.

The torque condition of the induction motor is known to a certain extent. The motor itself generates running torque without making a stop, if the induction motor is designed on the torque condition. This is because a specific phenomenon called slip occurs in the induction motor. FIG. 10 shows the relation between the number of revolutions and torque in the induction motor. In the drawing, a horizontal axis represents the number of revolutions of the induction motor, and a vertical axis represents the torque. In the case of the induction motor, as shown in the drawing, the number of revolutions (the horizontal axis of FIG. 10) does not largely vary due to the slip, if the torque (the vertical axis of FIG. 10) varies.

Figure 11:
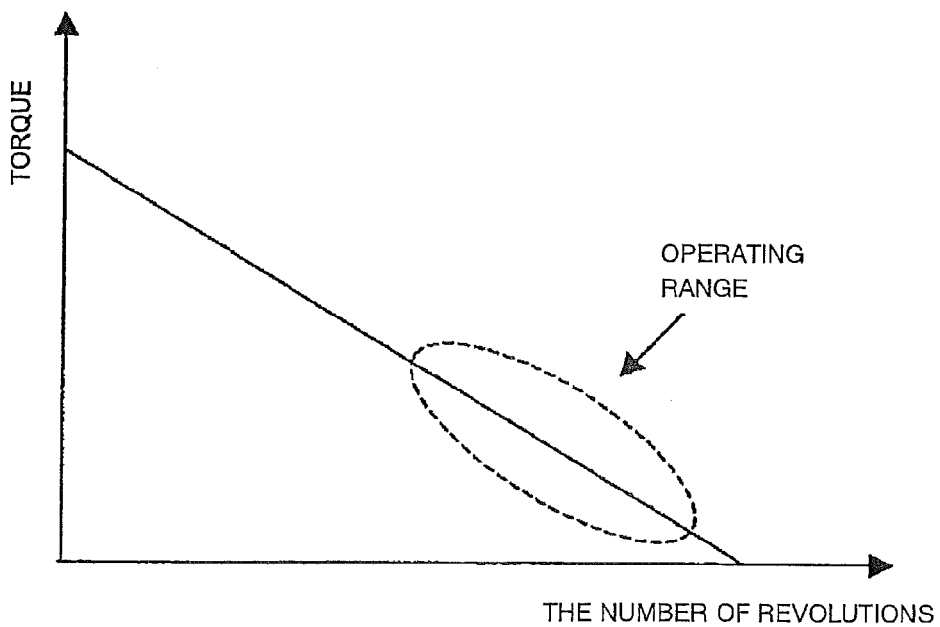
FIG. 11 is a graph showing the relation between the number of revolutions and torque in the permanent magnet motor, which is explained in the first embodiment of the present invention.

The permanent magnet motor, however, is the synchronous motor without slip. When its speed is not controlled, the relation between the number of revolutions and torque is as that shown in FIG. 11. FIG. 11 is a graph which shows the relations between the number of revolutions and the torque in the permanent magnet motor. In the drawing, a horizontal axis represents the number of revolutions of the permanent magnet motor, and a vertical axis represents the torque. It is apparent from FIG. 11 that the number of revolutions largely varies when the load torque varies in the permanent magnet motor, in contrast to the induction motor shown in FIG. 10. Accordingly, speed control is necessary to stabilize (hardly vary) the number of revolutions. In this case, however, there is a possibility that the motor enters a state of stop called step out, when the load torque equal to or more than available torque is applied. Furthermore, it is necessary to consider stability by the speed control in terms of control theory.

The characteristic of the permanent magnet motor, that is, high efficiency cannot be used, unless the motor is set on the condition that the torque condition is known. In this case, even if the induction motor is replaced with the permanent magnet motor, the energy saving effect could be less realized than being expected. However, when the motor and the product are evaluated with the inverter having the automatic tuning function, as in the case of the present embodiment, the foregoing problem is resolved. Thus, it is possible to obtain effects of reduction in development time, reduction in development cost, the achievement of energy saving, and the like.

By offering the service, as described above, the user A does not need to consider the operating specifications, and hence it is possible to shorten a design period. It is also possible to incorporate specifications corresponding to actual use into the product, so that the reliability of the product is improved. Also, it is easy to expand the lineup of the product, and hence the maker could have wide variety of models.

It becomes possible to easily replace the induction motor with the permanent magnet motor, and hence the energy saving of the product is easily realized. Furthermore, the number of evaluation can be reduced, so that it is possible to shorten an evaluation period. If the evaluation period is the same as that of conventional one, it is possible to carry out fine evaluation in detail, and hence the reliability of the product is further improved.

Since the design period and the evaluation period are shortened, product cost occurring thereby can be restrained to achieve low-cost products. Furthermore, the number of building a prototype of a sample by the maker B is substantially reduced, so that the user A can purchase the motor at low cost. Therefore, there is the effect of reduction in the production cost.

In the service of offering the automatic tuning inverter and the motor according to the present invention, the user A and the maker B can share the data of operating environment through the purchased and sold motors. Conventionally, for example, it is necessary to tell nuance which could not be correctly told by a telephone or a facsimile, to get OK in the operation evaluation (S-25) shown in FIG. 9(a). Thus, it is important to share sense, not data.

Figure 12:
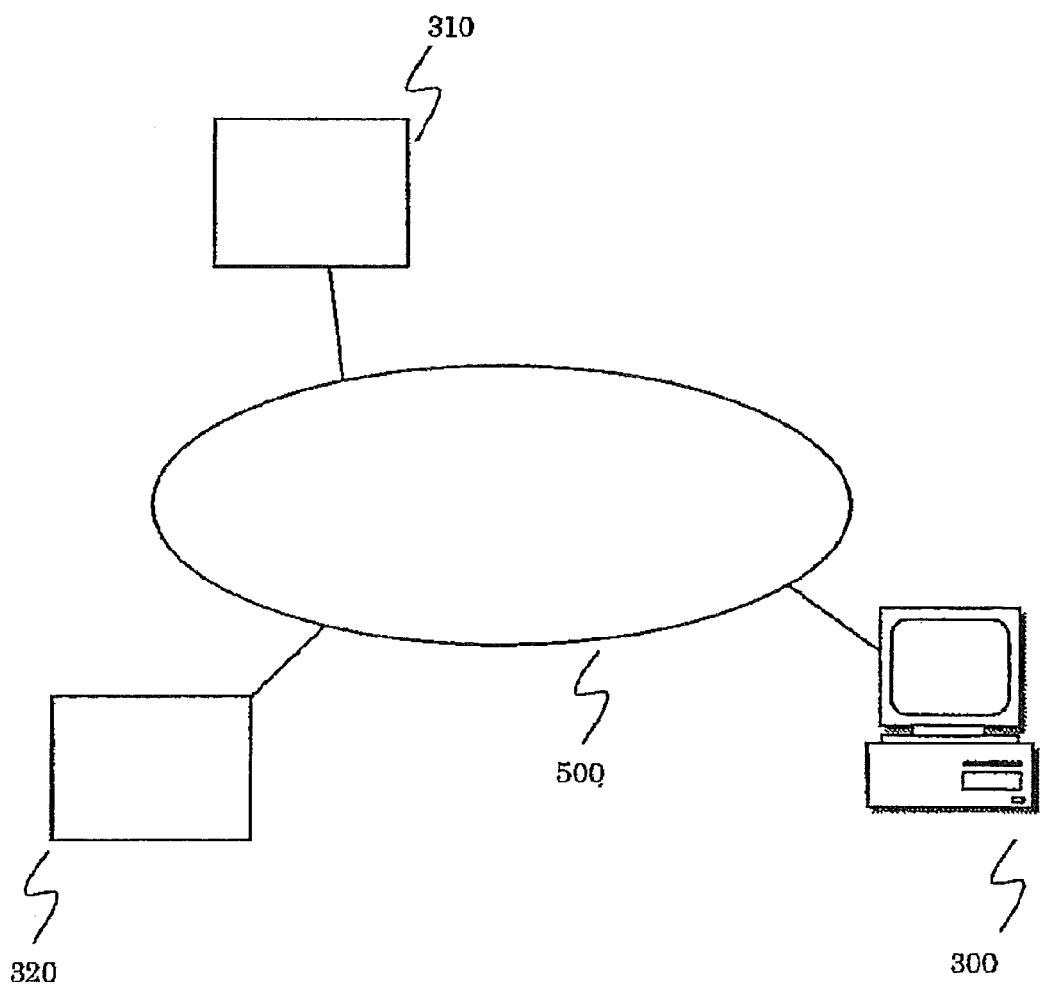
FIG. 12 is a block diagram showing the first embodiment of the present invention.

In this service, as shown in FIG. 12, it is possible to share the operating environment as numerical data. FIG. 12 is a block diagram showing the present embodiment. In FIG. 12, operating parameters, operating specifications, and the like extracted by an automatic tuning inverter are stored in a server 300 for data sharing through the Internet 500 as numerical data indicating operating conditions. A maker 310 builds a prototype of a sample motor on the basis of the data stored therein. The prototyped motor is sent to a user 320, and the user 320 installs the motor in a product for evaluation. The maker 310 can check the performances of the sample motor from the server 300 with respect to the data of evaluation.

As described above, the nuance was shared conventionally. Use of the automatic tuning inverter, however, makes it possible to share numerical values. Reversion is eliminated in developing the product, and a development period is shortened. Not only the user who receives the provision of the service, but also the maker who provides the service can supply the product with higher quality. In the case of the motor, as shown in for example FIG. 8, the foregoing numerical data of the operating environment cannot be optimized, when load torque conditions are unknown. In other words, it is impossible to efficiently operate the motor. The torque conditions such as an operating torque range, the rated torque, starting torque, and the like can be taken in through the automatic tuning function, as described above. When the motor operates while being installed in a product of load, such as a compressor and a fan, torque varies with difference in environment such as ambient temperature and a pressure loss, even if the motor operates at the same number of revolutions. If parameters including operating data and the like in accordance with the environmental conditions in conjunction with the motor and the load which are provided for each motor by the inverter circuit 2 are automatically tuned and calculated, it is possible to obtain not only constants for efficiently operating the motor, but also the limit specifications of the motor. In such a manner, it is possible to prevent the motor from having excessive specifications with respect to the load. A contract according to the present invention can take any form such as communication processing. A charge for each service described above is paid by any form such as electronic payment using communication. For example, data such as the output, efficiency, and the like of the motor can be automatically grasped in communication. Thus, reduction in input due to version-up from the conventional product, that is, the difference in power rate between the conventional product and the new product may be charged, and paid as a service charge. The service charge is paid according to the conditions of the concluded contract, anyway.

The service comprises the operating specifications evaluation step and the motor specifications decision step. In the operating specifications evaluation step, the driving device for identifying the motor constants of the permanent magnet motor, and the sample motor for grasping the operating environment are provided for the customer who has purchased or will purchase the permanent magnet motor, and the sample motor installed in the product is driven by the driving device to evaluate operating specifications. In the motor specifications decision step, the specifications of the supplied permanent magnet motor are decided on the basis of the operating parameters extracted in the operating specifications evaluation step. Thus, it is possible to provide a method for deciding the specifications of the motor, by which reversion is eliminated in developing the product and a development period is shortened.

The service further comprises the operating parameters storing step and the specifications decision step. In the operating parameters storing step, the operating parameters extracted in the operating specifications evaluation step are stored in the server as the numerical data through communication means such as the Internet. In the specifications decision step, the specifications of the supplied permanent magnet motor are decided on the basis of the operating parameters stored in the server. Therefore, it is possible to exchange data in short time, and shorten the development time. Since the driving device is the automatic tuning inverter, it is possible to decide the specifications of the motor, even if the motor has any specifications.

As described in the embodiment of the present invention, the service comprises the service contract conclusion step, the driving device provision step, and the product version-up step. In the service contract conclusion step, the service contract is concluded with the customer who has purchased or will purchase the product in which the permanent magnet motor is installed. In the driving device provision step, the driving device which can drive the permanent magnet motor with any specifications is provided on the basis of the service contract. In the product upgrade step, the drive of the product with the permanent magnet motor is controlled for upgrade so as to improve the performances of the product with the permanent magnet motor, by driving the permanent magnet motor by the driving device. The offer of the service using the automatic tuning inverter makes it possible to offer energy saving technology to the user at low cost, and to easily introduce the permanent magnet motor to the product manufactured by the user.

The service comprises the service contract conclusion step, the driving device provision step, and the motor supply step. In the service contract conclusion step, the service contract is concluded with the customer who has purchased or will purchase the product in which the permanent magnet motor is installed. In the driving device provision step, the driving device which can drive the permanent magnet motor with any specifications is provided on the basis of the service contract. In the motor supply step, a plurality of permanent magnet motors with different specifications are driven by the driving device provided in the driving device provision step, and the motor to be supplied is decided on the basis of the evaluation results of the performance of the products by the identical driving device. Thus, it is possible to compare the products with the motors which have different specifications and are made by different makers, under the same conditions, and hence it is possible to purchase the energy-saving product coinciding with the specifications of the customer at low cost.

The service comprises the driving device provision step, and the motor provision step. In the driving device provision step, the driving device of the permanent magnet motor, which can drive the permanent magnet motor with any specifications by identifying motor constants is provided for the customer who purchases the permanent magnet motor and manufactures the product with the permanent magnet motor. In the motor provision step, the driving device drives the permanent magnet motor installed in the product in order to provide the permanent magnet motor coinciding with the product specifications needed by the customer. Therefore, it is possible to provide the product with the permanent magnet motor installed, which can satisfy the specifications required by the customer, in short time and at low cost.

The service comprises the service contract conclusion step, the driving device provision step, and the motor specifications decision step. In the service contract conclusion step, the service contract is concluded with the customer who has purchased or will purchase the product in which the permanent magnet motor is installed. In the driving device provision step, the driving device which can drive the permanent magnet motor with any specifications by identifying the motor constants is provided on the basis of the service contract. In the motor specifications decision step, the specifications of the motor to be supplied are decided on the basis of the evaluation results of the performance of the product in which the permanent magnet motor is driven by the driving device supplied in the driving device provision step. Therefore, it is possible to easily verify the specifications of the motor on an actual device, and to provide the product in short time and at low cost.

The service comprises the service contract conclusion step, the driving device provision step, and the motor specifications decision step. In the service contract conclusion step, the service contract is concluded with the customer who has purchased or will purchase the product in which the permanent magnet motor is installed. In the driving device provision step, the driving device which can drive the permanent magnet motor with any specifications is provided on the basis of the service contract. In the motor specifications decision step, the specifications of the motor to be supplied to the customer are decided on the basis of the evaluation results of the performance of the product in which the permanent magnet motor is driven by the driving device supplied in the driving device provision step. An energy saving price corresponding to power consumption saving is calculated on the basis of difference between consumed power data in the case of using the permanent magnet motor decided in the motor specifications decision step and current consumed power data. The energy saving price is reflected on a charge for the provision of the driving device and the permanent magnet motor. Thus, it is possible for the customer to reduce initial investment cost for the change of facilities, and to achieve the energy saving. The service provider can collect cost for facilities from a profit on the energy saving.

The service comprises the motor constants identification step, the motor driving step, and the product upgrade step. In the motor constants identification step, the driving device which can identify the motor constants of the permanent magnet motor is provided for the user who has purchased or will purchase the product with the permanent magnet motor, and when the motor is exchanged, the motor constants of the substituted permanent magnet motor are identified by the driving device. In the motor driving step, the substituted permanent magnet motor is driven with the motor constants obtained in the motor constant identification step. In the product upgrade step, the operation of the substituted permanent magnet motor which is driven in the motor driving step is controlled at the efficient operating point of the motor to increase the performance of the product. Therefore, it is possible to offer the energy saving technology to the user at low cost, and to easily introduce the permanent magnet motor to the product which is manufactured by the user.

The service comprises the motor constants identification step, the motor driving step, the performance evaluation step, and the motor operation control step. In the motor constants identification step, the driving device which can identify the motor constants of the permanent magnet motor is provided for the user who has purchased or will purchase the product with the permanent magnet motor, and when the motor is exchanged, the motor constants of the permanent magnet motors before and after exchange are identified by the driving device. In the motor driving step, the permanent magnet motors before and after the exchange are driven with the motor constants obtained in the motor constant identification step. In the performance evaluation step, the performance of the permanent magnet motors before and after the exchange is evaluated by driving the permanent magnet motors before and after the exchange in the motor driving step. In the motor operation control step, the operation of the permanent magnet motor after the exchange is controlled at the efficient operating point, so as to improve the performance of the product with the permanent magnet motor after the exchange as compared with that before the exchange on the basis of the evaluation results of the performance of the permanent magnet motors before and after the exchange obtained in the performance evaluation step. Therefore, it is possible to compare the products with the motors which have different specifications and are made by different makers, under the same conditions. It is possible to purchase the energy-saving product which meets the specifications of the customer, at low cost.

The service comprises the operating specifications evaluation step, the specifications decision step, and the motor operation control step. In the operating specifications evaluation step, the driving device which can identify the motor constants of the permanent magnet motor, and the sample motor for grasping the operating environment are provided for the customer who has purchased or will purchase the permanent magnet motor or the product with the permanent magnet motor, and the sample motor installed in the product is driven by the driving device to evaluate the operating specifications of the product. In the specifications decision step, the specifications of the permanent magnet motor to be supplied are decided on the basis of the operating parameters extracted in the operating specifications evaluation step. In the motor operation control step, the permanent magnet motor which satisfies the product specifications obtained in the specifications decision step is provided, and the driving device controls the operation of the permanent magnet motor so as to improve the performance of the product in which the permanent magnet motor is installed. Therefore, it is possible to easily verify the specifications of the motor on an actual device, and to provide the product in a short period and at low cost.

The service also comprises the storing step and the specifications decision step. In the storing step, the operating parameters extracted in the operating specifications evaluation step are stored in the server as numerical data through communication means such as the Internet and electric power line communication. In the specifications decision step, the specifications of the permanent magnet motor to be supplied are decided on the basis of the operating parameters stored in the server in the storing step. Therefore, it is possible to easily and immediately obtain the operating parameters from the server, and to decide the specifications of the motor at low cost and in a short period.

The service comprises the performance evaluation step, the motor specifications decision step, and the energy saving price calculation step. In the performance evaluation step, the driving device, which can identify the motor constants of the permanent magnet motor, is provided for the customer who has purchased or will purchase the product with the permanent magnet motor, and when the permanent magnet motor is exchanged, the permanent magnet motor before exchange is driven by the driving device to evaluate its performance. In the motor specifications decision step, the specifications of the permanent magnet motor after the exchange are decided so as to improve the performance of the product in which the permanent magnet motor after the exchange is installed, on the basis of the evaluation results of the performance of the permanent magnet motor before the exchange obtained in the performance evaluation step. In the energy saving price calculation step, the energy saving price corresponding to electric power consumption is calculated on the basis of difference between consumed power data in the case where the permanent magnet motor having the specifications decided in the motor specifications decision step is used, and current consumed power data. The energy saving price is reflected on a charge for the provision of the driving device and the permanent magnet motor. Therefore, it is possible for the customer to reduce initial investment cost for the change of facilities, and to achieve the energy saving. The service provider can collect cost for facilities from a profit on the energy saving.

Since the driving device is the automatic tuning inverter, it is possible to easily exchange the motor at low cost and in a short period, even if the motor has any specifications. In the case where the motor is exchange for a second time or later, the inverter program or the inverter circuit is provided instead of the driving device, so that it is possible to offer the service at low cost. The service is offered based on the service contract, so that the user can receive the service such as the exchange of the compressor at ease. The service provider can also provide the service at low cost and in a short period. In other words, according to the present invention, it is possible to always secure high efficiency by the automatic tuning function in selecting the motor or over long term operation. Also, use of the automatic tuning function makes it possible to clarify the operation and performance of a combination of the motor and the inverter, and hence it is possible to obtain a method and a device which are effective at maintaining the performance of the product.

The invention claimed is:

1. A method for driving a motor, the method comprising:
a constant identification step in which an inverter having an automatic tuning function for identifying a motor constant of a motor or a program of said inverter is used to identify a motor constant and a parameter for starting said motor, said constant identification step including forcedly applying a voltage to said motor for activation and rotation, and said motor constant including a phase resistance component, an inductance component, and a counter-electromotive voltage constant of said motor; and
an inverter control step in which said inverter or said program uses said motor constant obtained in said constant identification step to operate said motor at an efficient operating point of said motor, wherein said motor is a synchronous machine and is driven by said inverter using said identified motor constant.

2. The method according to claim 1, wherein said motor is driven while monitoring variation in a counter-electromotive voltage constant obtained in said constant identification step.

3. The method according to claim 1, wherein said motor is driven by said inverter by position sensor-less.

4. The method according to claim 1, wherein said inverter having the automatic tuning function for identifying the motor constant of said motor or the program of the inverter drives said motor, and the efficiency of said motor is monitored relative to said identified motor constant during operation.

5. The method according to claim 1, wherein said inverter having the automatic tuning function for identifying the motor constant of said motor or the program of the inverter is provided at the start of a service contract associated with said motor.

6. The method according to claim 1, wherein in said constant identification step, a direct-current voltage is applied from said inverter so as to lock the motor, and the resistance component is identified from the resulting current.

7. The method according to claim 1, wherein in said constant identification step, a pulse voltage with a high frequency is applied to the motor, and the inductance component is identified from the applied pulse voltage and the detected pulse current.

8. The method according to claim 1, wherein in said constant identification step, the counter-electromotive voltage constant is calculated by use of a voltage current equation of the motor.

9. A method for driving a motor, the method comprising:
a constant identification step in which an inverter having an automatic tuning function for identifying a motor constant of a motor or a program of said inverter is used to identify a motor constant and a parameter for starting said motor, said constant identification step including forcedly applying a voltage to said motor for activation and rotation, and said motor constant including a phase resistance component, an inductance component, and a counter-electromotive voltage constant of said motor;
an inverter control step in which said inverter or said program uses said motor constant obtained in said constant identification step to operate said motor at an efficient operating point of said motor, wherein said motor is a synchronous machine and is driven by said inverter using said identified motor constant;
a storing step, in which an operating parameter extracted in an operating specifications evaluation step is stored in a server as numerical data via the Internet; and
a specifications decision step, in which operating specifications of said motor are determined based on said operating parameter stored in said server.

10. A method for driving a motor, the method comprising:
a constant identification step in which an inverter having an automatic tuning function for identifying a motor constant of a motor or a program of said inverter is used to identify a motor constant and a parameter for starting said motor, said constant identification step including forcedly applying a voltage to said motor for activation and rotation, and said motor constant including a phase resistance component, an inductance component, and a counter-electromotive voltage constant of said motor;
an inverter control step in which said inverter or said program uses said motor constant obtained in said constant identification step to operate said motor at an efficient operating point of said motor, wherein said motor is a synchronous machine and is driven by said inverter using said identified motor constant;

a performance evaluation step in which a first motor is driven by said inverter or said program of said inverter to evaluate operating performance of said first motor; and a motor specifications decision step in which the specifications of a second motor are determined so as to improve the operating performance of a product containing said second motor on the basis of the evaluation results of the performance of said first motor obtained in said performance evaluation step, wherein said first motor is an induction motor or a rectangular wave drive permanent magnet motor, and said second motor is a sine wave drive permanent magnet motor, said first motor being exchanged with said second motor in said motor specifications decision step.

11. A method for driving a motor, the method comprising:

a constant identification step in which an inverter having an automatic tuning function for identifying a motor constant of a motor or a program of said inverter is used to identify a motor constant and a parameter for starting said motor, said constant identification step including forcedly applying a voltage to said motor for activation and rotation, and said motor constant including a phase resistance component, an inductance component, and a counter-electromotive voltage constant of said motor;

an inverter control step in which said inverter or said program uses said motor constant obtained in said constant identification step to operate said motor at an efficient operating point of said motor, wherein said motor is a synchronous machine and is driven by said inverter using said identified motor constant;

a performance evaluation step in which a first motor is exchanged with a second motor, and said first motor is driven by said inverter for identifying a motor constant of said first motor, so as to evaluate the operating performance of said first motor;

a motor specifications decision step in which the specifications of said second motor are determined so as to improve the operating performance of a product containing said second motor on the basis of the evaluation results of the performance of said first motor obtained in said performance evaluation step; and a price calculation step in which a price corresponding to electric power consumption is calculated on the basis of a difference between power consumption data obtained when using a motor having specifications determined in said motor specifications decision step and current power consumption data, wherein said price reflects on a charge for the provision of said inverter and said motor.

12. A method for deciding the specifications of a motor comprising:

an operating specifications evaluation step in which a driving device for identifying a motor constant of a permanent magnet motor and a sample motor for obtaining operating conditions are provided to a user of said motor, and said sample motor installed in a product is driven by said driving device to evaluate operating specifications;

a specifications decision step in which the operating specifications of said permanent magnet motor to be supplied are determined on the basis of an operating parameter extracted in said operating specifications evaluation step;

an operating parameter storing step in which the operating parameter extracted in said operating specifications evaluation step is stored in a server as numerical data through communication means including the Internet; and a specifications decision step, in which the operating specifications of said permanent magnet motor are decided based on said operating parameter stored in said server.

13. A method for providing a compressor version-up service comprising:

an operating specifications evaluation step in which a driving device for identifying a motor constant of a permanent magnet motor is provided to a user of a compressor having said permanent magnet motor installed therein, and said driving device drives said permanent magnet motor installed in said compressor to extract a first counter-electromotive voltage constant and a second counter-electromotive voltage constant of said permanent magnet motor;

an efficiency monitoring step in which the efficiency of a product is monitored based on a variation between said first counter-electromotive voltage constant of said permanent magnet motor obtained in said operating specifications evaluation step and said second counter-electromotive voltage constant of said permanent magnet motor obtained in said operating specifications evaluation step, said compressor with said permanent magnet motor being installed in said product from a second counter-electromotive voltage constant of said permanent magnet motor obtained in said operating specifications evaluation step; and an efficiency reduction reporting step in which an efficiency improvement measure including such as the timing of exchanging said compressor is reported by an indicator, when the efficiency of said product obtained in said efficiency monitoring step is reduced.

14. The method for providing a compressor version-up service according to claim 13, wherein said indicator reporting reduction in the efficiency includes a lamp.

15. A method for providing an energy saving service using a driving device of a permanent magnet motor comprising:

a storing step, in which an operating parameter extracted in an operating specifications evaluation step is stored in a server as numerical data via the Internet;

a specifications decision step in which operating specifications of said permanent magnet motor are determined based on said operating parameter stored in said server;

a driving device provision step in which a driving device which can drive any permanent magnet motor with different operating specifications is provided on the basis of a service contract of a user of a product having said permanent magnet motor; and a product upgrade step in which said driving device controls the drive of said permanent magnet motor so as to improve the performance of the product with said permanent magnet motor, to upgrade the product with said permanent magnet motor.

16. A method for providing an energy saving service using a driving device of a permanent magnet motor comprising:

a storing step, in which an operating parameter extracted in an operating specifications evaluation step is stored in a server as numerical data via the Internet;

a specifications decision step in which operating specifications of said permanent magnet motor are determined based on said operating parameter stored in said server;

a driving device provision step in which a driving device which can drive any permanent magnet motor with different operating specifications is provided on the basis of a service contract of a user of a product having said permanent magnet motor; and a motor supply step in which the driving device provided in said driving device provision step drives a plurality of permanent magnet motors having different operating specifications, and a motor to be used in the product is determined on the basis of the evaluation results of the performance of products by an identical driving device.

17. A method for providing an energy saving service using a driving device of a permanent magnet motor comprising:

a storing step, in which an operating parameter extracted in an operating specifications evaluation step is stored in a server as numerical data via the Internet;

a specifications decision step in which operating specifications of said permanent magnet motor are determined based on said operating parameter stored in said server;

a driving device provision step in which a driving device of a permanent magnet motor which can drive any permanent magnet motor with different operating specifications by identifying a motor constant is provided to a user of a permanent magnet motor to manufacture a product with said permanent magnet motor; and a motor provision step in which said driving device drives said permanent magnet motor of said product, to provide a permanent magnet motor coinciding with product specifications required by said user.

18. A method for providing an energy saving service using a driving device of a permanent magnet motor comprising:

a storing step, in which an operating parameter extracted in an operating specifications evaluation step is stored in a server as numerical data via the Internet;

a specifications decision step in which operating specifications of said permanent magnet motor are determined based on said operating parameter stored in said server;

a driving device provision step in which a driving device which can drive any permanent magnet motor with different operating specifications by identifying a motor constant is provided on the basis of a service contract to a user of a product with said permanent magnet motor; and a motor specifications decision step in which the operating specifications of a motor to be used in the product are decided on the basis of the evaluation results of the performance of said product, said driving device provided in said driving device provision step driving said permanent magnet motor in said product.

19. A method for providing an energy saving service using a driving device of a permanent magnet motor comprising:

a storing step, in which an operating parameter extracted in an operating specifications evaluation step is stored in a server as numerical data via the Internet;

a specifications decision step in which operating specifications of said permanent magnet motor are determined based on said operating parameter stored in said server;

a driving device provision step in which a driving device which can drive any permanent magnet motor with different operating specifications is provided on the basis of a service contract to a user of a product having said permanent magnet motor; and a motor specifications decision step in which the operating specifications of a motor to be used in the product are decided on the basis of the evaluation results of the performance of said product, the driving device provided in said driving device provision step driving said permanent magnet motor in said product, wherein a price is calculated on the basis of a difference between power consumption data in the case of using the permanent magnet motor decided in said motor specifications decision step and current power consumption data, and said price reflects a charge for the provision of said driving device and said permanent magnet motor.

20. A method for exchanging a compressor comprising:

an operating specifications evaluation step in which, when a motor-driven old compressor used in a refrigeration cycle is exchanged for a new compressor, an inverter for identifying a motor constant of a synchronous motor of an alternative compressor with different operating specifications is provided together with said alternative compressor, and said inverter drives said synchronous motor of said alternative compressor to operate said refrigeration cycle, thereby extracting a motor constant of said synchronous motor including a counter-electromotive voltage constant;

a step of operating said refrigeration cycle in which said inverter drives said alternative compressor by use of the motor constant of said synchronous motor obtained in said operating specifications evaluation step, wherein said alternative compressor is used in an emergency measure until said new compressor is used;

a storing step, in which an operating parameter extracted in an operating specifications evaluation step is stored in a server as numerical data via the Internet; and a specifications decision step, in which operating specifications of said synchronous motor are determined based on said operating parameter stored in said server.

21. A freezing/air conditioning device comprising:

a permanent magnet motor operated at variable speed by an inverter having an automatic tuning function or a program of the inverter, the inverter being able to iteratively detect a counter-electromotive voltage constant of said motor;

a compressor driven by said permanent magnet motor, for discharging a refrigerant circulating through a refrigeration cycle; and a monitor device for monitoring performance such as a reduction in efficiency by determining a variation between a first counter-electromotive voltage constant and a second counter-electromotive voltage constant detected during operation, wherein reduction in the efficiency is reported by an alarm.

* * * * *